US006985660B2

(12) United States Patent
Koshiba et al.

(10) Patent No.: US 6,985,660 B2
(45) Date of Patent: Jan. 10, 2006

(54) MULTIPLE CLADDING OPTICAL FIBER

(75) Inventors: Masanori Koshiba, Sapporo (JP);
Kunimasa Saitoh, Sapporo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 105 days.

(21) Appl. No.: 10/731,501

(22) Filed: Dec. 10, 2003

(65) Prior Publication Data
US 2004/0114897 A1   Jun. 17, 2004

(30) Foreign Application Priority Data
Dec. 10, 2002  (JP)  ............................ P2002-358462
May 15, 2003  (JP)  ............................ P2003-137628

(51) Int. Cl.
G02B 6/02 (2006.01)
G02B 6/16 (2006.01)

(52) U.S. Cl. ...................... 385/123; 385/124; 385/125; 385/126; 385/127; 385/128; 398/81; 398/147

(58) Field of Classification Search ........ 385/123–128; 398/81, 147
See application file for complete search history.

(56) References Cited

U.S. PATENT DOCUMENTS

| | | | | |
|---|---|---|---|---|
| 5,363,463 A | * | 11/1994 | Kleinerman | 385/123 |
| 5,802,236 A | | 9/1998 | DiGiovanni et al. | 385/127 |
| 5,841,926 A | * | 11/1998 | Takeuchi et al. | 385/123 |
| 6,434,311 B1 | * | 8/2002 | Danziger et al. | 385/126 |
| 6,636,677 B2 | * | 10/2003 | Hasegawa et al. | 385/127 |
| 2001/0055455 A1 | * | 12/2001 | Hasegawa et al. | 385/127 |
| 2004/0071423 A1 | * | 4/2004 | Libori et al. | 385/127 |

FOREIGN PATENT DOCUMENTS
WO    WO 00/16141    3/2000

OTHER PUBLICATIONS

A. Ferrando et al., "Designing the Properties of Dispersion-Flattened Photonic Crystal Fibers", Optics Express, Optical Society of America, Dec. 17, 2001, vol. 9, No. 13, pp. 687-697.
A. Ferrando et al., "Nearly Zero Ultraflattened Dispersion in Photonic Crystal Fibers", Optic Letters, Optical Society of America, Jun. 1, 2000, vol. 25, No. 11, pp. 790-792.
A. Ferrando et al., "Designing a Photonic Crystal Fibre with Flattened Chromatic Dispersion", Electronics Letters, Feb. 18, 1999, vol. 35, No. 4, pp. 325-327.

(Continued)

Primary Examiner—Brian Healy
Assistant Examiner—Jerry Martin Blevins
(74) Attorney, Agent, or Firm—McDermott Will & Emery LLP

(57) ABSTRACT

An optical fiber comprises a core region extending along a predetermined axis X, and a cladding region surrounding the core region. The cladding region 14 comprises first to (N+1)-th regions such that the first region surrounds the core region, and the (k+1)-th region surrounds the k-th region (k=1, 2, . . . , N). At least one of the first to (N+1)-th regions includes, in a main medium having a predetermined refractive index, a sub-region made of an auxiliary medium having a refractive index different from that of the main medium. Letting $n[0]$ be the average refractive index of the core region, and $n[k]$ ($k=1, 2, \ldots, N+1$) be the average refractive index of the k-th region, this optical fiber satisfies the relationship of $n[0]>n[1]$, and $n[i]>n[i+1]$ ($\forall i=h, h+1, \ldots, h+m$; where h and m are natural numbers).

33 Claims, 20 Drawing Sheets

OTHER PUBLICATIONS

T.P. White et al., "Confinement Losses in Microstructured Optical Fibers", Optics Letters, Nov. 1, 2001, vol. 26, No. 21, pp. 1660-1662.

W. H. Reeves et al., "Demonstration of Ultra-Flattened Dispersion in Photonic Crystal Fibers", Optics Express, Jul. 15, 2002, vol. 10, No. 14, pp. 609-613.

* cited by examiner

MULTIPLE CLADDING OPTICAL FIBER

BACKGROUND OF THE INVENTION

1. Field of the Invention

The present invention relates to an optical fiber.

2. Related Background Art

Various optical fiber structures have conventionally been proposed. Among them, a so-called microstructure optical fiber including voids axially extending therethrough has been known. This optical fiber is constituted by a main medium such as silica glass and an auxiliary medium such as a gas. Utilizing the refractive index difference between the main and auxiliary media, the optical fiber regulates the refractive index, thereby adjusting characteristics such as chromatic dispersion.

SUMMARY OF THE INVENTION

The inventor studied the prior art mentioned above and, as a result, has found the following problems. Namely, the above-mentioned conventional optical fiber does not have a configuration in which the average refractive index in a cladding decreases stepwise over three or more layers toward the radially outer side. Therefore, the degree of light spread to outer regions in the cladding does not greatly depend on the wavelength, whereby the cladding region greatly influencing dispersion characteristics is the same regardless of the wavelength. Hence, the influence of individual layers on the chromatic dispersion characteristic drastically decreases from inner layers to outer layers, so that the degree of freedom in adjusting the chromatic dispersion and the adjustable wavelength range are limited. This causes problems in that the wavelength range yielding a flattened dispersion in a dispersion-flattened fiber is small, and in that the wavelength range in which the average dispersion can be made lower in a dispersion-compensating fiber is small. Also, no structures with dispersion nonflatness insensitive to scale fluctuations in a waveguide structure have been found. It has also been problematic in that production of diversified products of dispersion-flattened fibers having respective average dispersion values different from each other is difficult, and in that dispersion-management fibers or dispersion-decreasing fibers having a flat dispersion over a wide wavelength band are hard to realize.

In view of the circumstances mentioned above, it is an object of the present invention to provide an optical fiber which can increase the degree of freedom in adjusting chromatic dispersion and the adjustable wavelength range.

The present invention provides an optical fiber comprising a core region extending along a predetermined axis, and a cladding region surrounding the core region. The cladding region has first to (N+1)-th regions (where N is an integer of 2 or greater) such that the first region surrounds the core region, and the (k+1)-th region surrounds the k-th region (k=1, 2, . . . , N+1). At least one of the first to (N+1)-th regions includes, in a main medium having a predetermined refractive index, a sub-region made of an auxiliary medium having a refractive index different from that of the main medium. Letting n[0] be the average refractive index of the core region, and n[k] (k=1, 2, . . . , N+1) be the average refractive index of the k-th region, this optical fiber satisfies the relationship of n[0]>n[1], and n[i]>n[i+1] ($\forall$i=h, h+1, . . . , h+m; where h and m are natural numbers).

In the optical fiber, the cladding region comprises at least three layer regions. In the three or more layer regions, the spread of light into outer regions increases as the wavelength is longer. Therefore, the dispersion characteristic at a shorter wavelength is influenced by inner regions, whereas the dispersion characteristic at a longer wavelength is influenced by outer regions. This increases the degree of freedom in adjusting chromatic dispersion and the adjustable wavelength range.

Preferably, the optical fiber satisfies the relationship of n[i]>n[i+1] ($\forall$i=0, 1, . . . , N). This can decrease the change in dispersion nonflatness caused by scale variations in the waveguide structure, and increase the degree of freedom in adjusting chromatic dispersion and the adjustable wavelength range. As a result, the dispersion nonflatness caused by fiber diameter variations in a predetermined axis direction can be suppressed. Such an optical fiber structure is suitable for making a plurality of kinds of optical fibers having different average dispersion values with a flattened dispersion by drawing them from a preform while changing the fiber diameter. This enables production of diversified products while suppressing the increase in cost. Further, such an optical fiber structure is suitable for drawing an optical fiber from a perform while changing the fiber diameter with an amplitude above a predetermined value in a longitudinal direction, thereby easily making a dispersion-managed fiber usable over a wide band.

Preferably, the cladding region further comprises an (N+2)-th region surrounding the (N+1)-th region. Preferably, the (N+2)-th and (N+1)-th regions have respective average refractive indices n[N+2] and n[N+1] satisfying the relationship of n[N+1]<n[N+2]. This increases the spread of light into outer cladding regions at longer wavelengths. This enhances the controllability of dispersion characteristic at longer wavelengths, thus making it possible to realize a flattened dispersion characteristic over a wider wavelength band.

Preferably, the main medium is pure silica glass, or silica glass including at least one of Ge, F, Cl, P, N, B, Al, Ti, Er, Yb, Nd, Pr, and Bi. Preferably, the auxiliary medium is a vacuum or gas. As a consequence, a wavelength band where a flattened dispersion can be realized and a wavelength band where transmission loss can be suppressed substantially coincide with each other, whereby an optical fiber having a flattened dispersion and a low loss can be realized.

Preferably, the optical fiber exhibits a dispersion nonflatness of 0.003 ps/nm$^2$/km or less at zero dispersion in a predetermined wavelength band having a width of at least 50 nm. This can suppress the waveform distortion when transmitting an optical signal occupying a wide wavelength band, thus making it possible to realize an optical fiber suitable for transmitting short-pulse light.

Here, the transmission loss in the predetermined wavelength band is preferably 0.1 dB/m or less. In this case, the transmission loss is low in the transmission of short-pulse light, so that a long transmission distance can be realized, whereby the input optical power required for transmission is lowered. As a result, the transmission quality can be restrained from deteriorating because of nonlinear optical effects.

Preferably, the optical fiber exhibits a dispersion nonflatness of 0.004 ps/nm$^2$/km or less in a predetermined wavelength band having a width of at least 50 nm, whereas the chromatic dispersion in the predetermined wavelength band is an anomalous dispersion having an average value of +20 ps/nm/km or less. This can realize an optical fiber suitable for soliton transmission over a wide band, wavelength-division multiplexing transmission (WDM transmission) over a wide band, and supercontinuum light generation over a wide band.

Here, the transmission loss in the predetermined wavelength band is preferably 0.1 dB/m or less. In this case, since the transmission loss is low, the transmission distance can be elongated in the WDM transmission or soliton transmission over a wide band, whereby the optical power required for transmission light is lowered. As a result, the transmission quality can be restrained from deteriorating because of nonlinear optical effects. Also, since the transmission loss is low, the required optical power can be lowered when generating supercontinuum light over a wide band.

Preferably, the optical fiber exhibits a dispersion nonflatness of 0.006 ps/nm$^2$/km or less in a predetermined wavelength band having a width of at least 50 nm, whereas the chromatic dispersion in the predetermined wavelength band is a normal dispersion having an average value of −20 ps/nm/km or greater. This can realize an optical fiber suitable for WDM transmission over a wide band and supercontinuum light generation over a wide band.

Here, the transmission loss in the predetermined wavelength band is preferably 0.1 dB/m or less. In this case, since the transmission loss is low, the transmission distance can be elongated in the WDM transmission or soliton transmission over a wide band, whereby the optical power required for transmission light is lowered. As a result, the transmission quality can be restrained from deteriorating because of nonlinear optical effects. Also, since the transmission loss is low, the required input optical power can be lowered when generating supercontinuum light over a wide band.

Preferably, in the optical fiber, a cross-sectional area of the sub-region made of the auxiliary medium in a cross section perpendicular to a predetermined axis varies along the predetermined axis. This can change the chromatic dispersion value along the predetermined axis while keeping the dispersion nonflatness low. This makes it possible to realize a dispersion-managed fiber and a dispersion-decreasing fiber which are usable over a wide band.

Preferably, the optical fiber comprises a first category fiber segment having a dispersion nonflatness of 0.007 ps/nm$^2$/km or less and an anomalous chromatic dispersion with an average value of +1 ps/nm/km or greater in a predetermined wavelength band having a width of at least 50 nm, and a second category fiber segment having a dispersion nonflatness of 0.007 ps/nm$^2$/km or less and a normal chromatic dispersion with an average value of −1 ps/nm/km or less in the predetermined wavelength band. This can realize a dispersion-managed fiber which can suppress the transmission quality deterioration caused by nonlinear optical effects and chromatic dispersion over a wide band in the WDM transmission and soliton transmission.

Preferably, the optical fiber comprises a fiber segment having one end and the other end. Preferably, the fiber segment exhibits a dispersion nonflatness of 0.007 ps/nm$^2$/km or less in a predetermined wavelength band having a width of at least 50 nm. Preferably, a chromatic dispersion at a predetermined wavelength at one end is an anomalous dispersion of +1 ps/nm/km or greater. Preferably, the chromatic dispersion continuously decreases from one end to the other end. Preferably, the other end exhibits a chromatic dispersion not greater than half of that at one end at the predetermined wavelength. This can realize a dispersion-decreasing optical fiber suitable for generating supercontinuum light with a high coherence over a wide band.

Preferably, letting $D(\lambda)$ be the chromatic dispersion with respect to each wavelength $\lambda$ included within a predetermined wavelength band having a width of at least 250 nm, and $F(\lambda)$ be the function defined by $F(\lambda)=a\lambda^{-4}+b\lambda^{-2}+c+d\lambda^2+e\lambda^4$ $a=-24.495$ [ps/nm/km/$\mu$m$^{-4}$]

$b=-54.564$ [ps/nm/km/$\mu$m$^{-2}$]

$c=35.069$ [ps/nm/km]

$d=1.8867$ [ps/nm/km/$\mu$m$^2$]

$e=0.80887$ [ps/nm/km/$\mu$m$^4$], a function $G(\lambda, x)$ is defined as $G(\lambda,x)=|(F(\lambda)+xD(\lambda))/(1+x)|$, and the optical fiber gives a positive number x satisfying the relationship of $G(\lambda, x)<0.25$ [ps/nm/km]. As a consequence, the chromatic dispersion of a single-mode optical fiber substantially given by the function $F(\lambda)$ can be compensated for over a wide range. Such a single-mode optical fiber is widely used in practice as an optical fiber defined by ITU-T G. 652.

Preferably, the optical fiber exhibits a transmission loss of 0.1 dB/m or less in the predetermined wavelength band. Since the transmission loss is low in this case, the amount of compensated dispersion can be enhanced in the dispersion compensation of the single-mode optical fiber defined by ITU-T G. 652, whereby the input optical power required for transmission is lowered. As a result, the transmission quality can be restrained from deteriorating because of nonlinear optical effects.

Preferably, the optical fiber satisfies the relationship of $n[0]>n[1]$, $n[1]<n[2]$, and $n[i]>n[i+1]$ ($\forall i=2, 3, \ldots, 2+m$; where m is a natural number). This can negatively enhance the structural dispersion over a wide wavelength band. As a result, a dispersion characteristic suitable for dispersion compensation over a wide range can be realized.

Preferably, the optical fiber exhibits a transmission loss of 3 dB/km or less in the predetermined wavelength band. Since the transmission loss is low in this case, the amount of compensated dispersion can be enhanced in the dispersion compensation of the single-mode optical fiber defined by ITU-T G. 652, whereby the input optical power required for transmission is lowered. As a result, the transmission quality can be restrained from deteriorating because of nonlinear optical effects.

In another aspect, the present invention provides an optical fiber comprising a core region extending along a predetermined axis, and a cladding region surrounding the core region. This optical fiber exhibits a dispersion nonflatness of 0.003 ps/nm$^2$/km or less at zero dispersion in a predetermined wavelength band having a width of at least 50 nm.

In another aspect, the present invention provides an optical fiber comprising a core region extending along a predetermined axis, and a cladding region surrounding the core region. This optical fiber exhibits a dispersion nonflatness of 0.004 ps/nm$^2$/km or less in a predetermined wavelength band having a width of at least 50 nm, whereas the chromatic dispersion in the predetermined wavelength band is an anomalous dispersion having an average value of +20 ps/nm/km or less.

In another aspect, the present invention provides an optical fiber comprising a core region extending along a predetermined axis, and a cladding region surrounding the core region. This optical fiber exhibits a dispersion nonflatness of 0.006 ps/nm²/km or less in a predetermined wavelength band having a width of at least 50 nm, whereas the chromatic dispersion in the predetermined wavelength band is a normal dispersion having an average value of −20 ps/nm/km or greater.

In another aspect, the present invention provides an optical fiber comprising a core region extending along a predetermined axis, and a cladding region surrounding the core region. The optical fiber comprises a first category fiber segment having a dispersion nonflatness of 0.007 ps/nm²/km or less and an anomalous chromatic dispersion with an average value of +1 ps/nm/km or greater in a predetermined wavelength band having a width of at least 50 nm and a second category fiber segment having a dispersion nonflatness of 0.007 ps/nm²/km or less and a normal chromatic dispersion with an average value of −1 ps/nm/km or less in the predetermined wavelength band.

In another aspect, the present invention provides an optical fiber comprising a core region extending along a predetermined axis, and a cladding region surrounding the core region. This optical fiber comprises a fiber segment having one end and the other end. In the fiber segment, the optical fiber exhibits a dispersion nonflatness of 0.007 ps/nm²/km or less in a predetermined wavelength band having a width of at least 50 nm. The chromatic dispersion at a predetermined wavelength is an anomalous dispersion of +1 ps/nm/km or greater at one end, and continuously decreases from one end to the other end. The chromatic dispersion at the other end is not greater than half of that at one end at the predetermined wavelength.

In another aspect, the present invention provides an optical fiber comprising a core region extending along a predetermined axis, and a cladding region surrounding the core region. Letting $D(\lambda)$ be the chromatic dispersion with respect to each wavelength $\lambda$ included within a predetermined wavelength band having a width of at least 250 nm, and $F(\lambda)$ be the function defined by $$F(\lambda)=a\lambda^{-4}+b\lambda^{-2}+c+d\lambda^{2}+e\lambda^{4}$$

$$a=-24.495\ [ps/nm/km/\mu m^{4}]$$

$$b=-54.564\ [ps/nm/km/\mu m^{-2}]$$

$$c=35.069\ [ps/nm/km]$$

$$d=1.8867\ [ps/nm/km/\mu m^{2}]$$

$$e=0.80887\ [ps/nm/km/\mu m^{4}],$$

a function $G(\lambda, x)$ is defined as $$G(\lambda, x)=|(F(\lambda)+xD(\lambda))/(1+x)|, \text{ and}$$

the optical fiber gives a positive number x satisfying the relationship of $G(\lambda, x)<0.25$ [ps/nm/km].

Preferably, letting $T[N+1]$ μm be the radial thickness of the (N+1)-th region, the optical fiber satisfies the relationship of $$T[N+1]\cdot\sqrt{n[0]^{2}-n[N+1]^{2}}>1.0.$$

This can reduce the optical confinement loss caused by the cladding region, thus making it possible to realize a low transmission loss.

Preferably, in the optical fiber, each sub-region made of an auxiliary medium included in the first to (N+1)-th regions is arranged in a hexagonal form in a cross section perpendicular to the predetermined axis.

The present invention will become more fully understood from the detailed description given hereinbelow and the accompanying drawings. They are given by way of illustration only, and thus should not be considered limitative of the present invention.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

Figure 1:
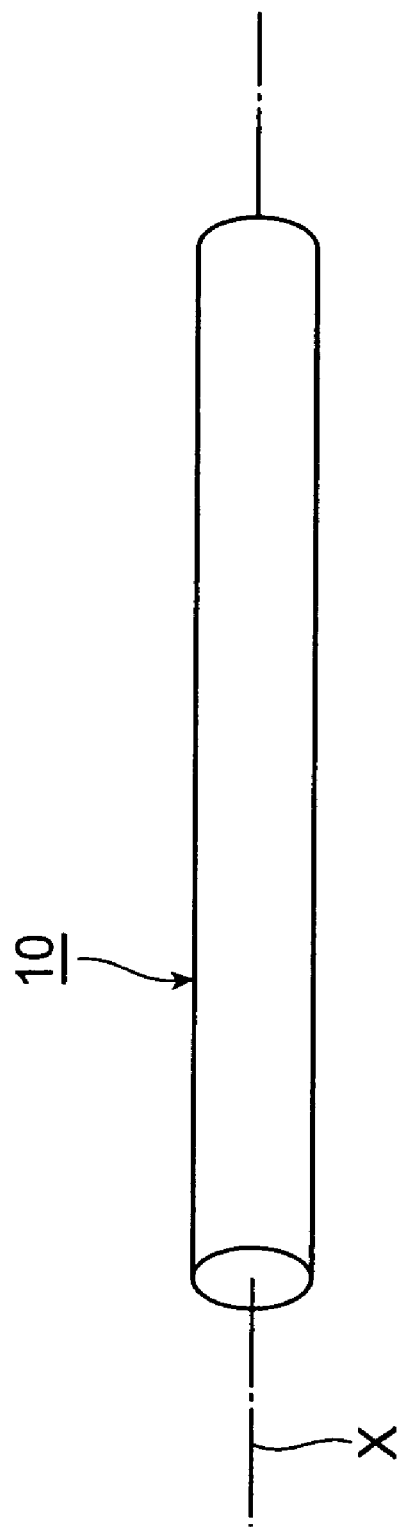
FIG. 1 is a view showing an optical fiber as seen from a side thereof.
Figure 2:
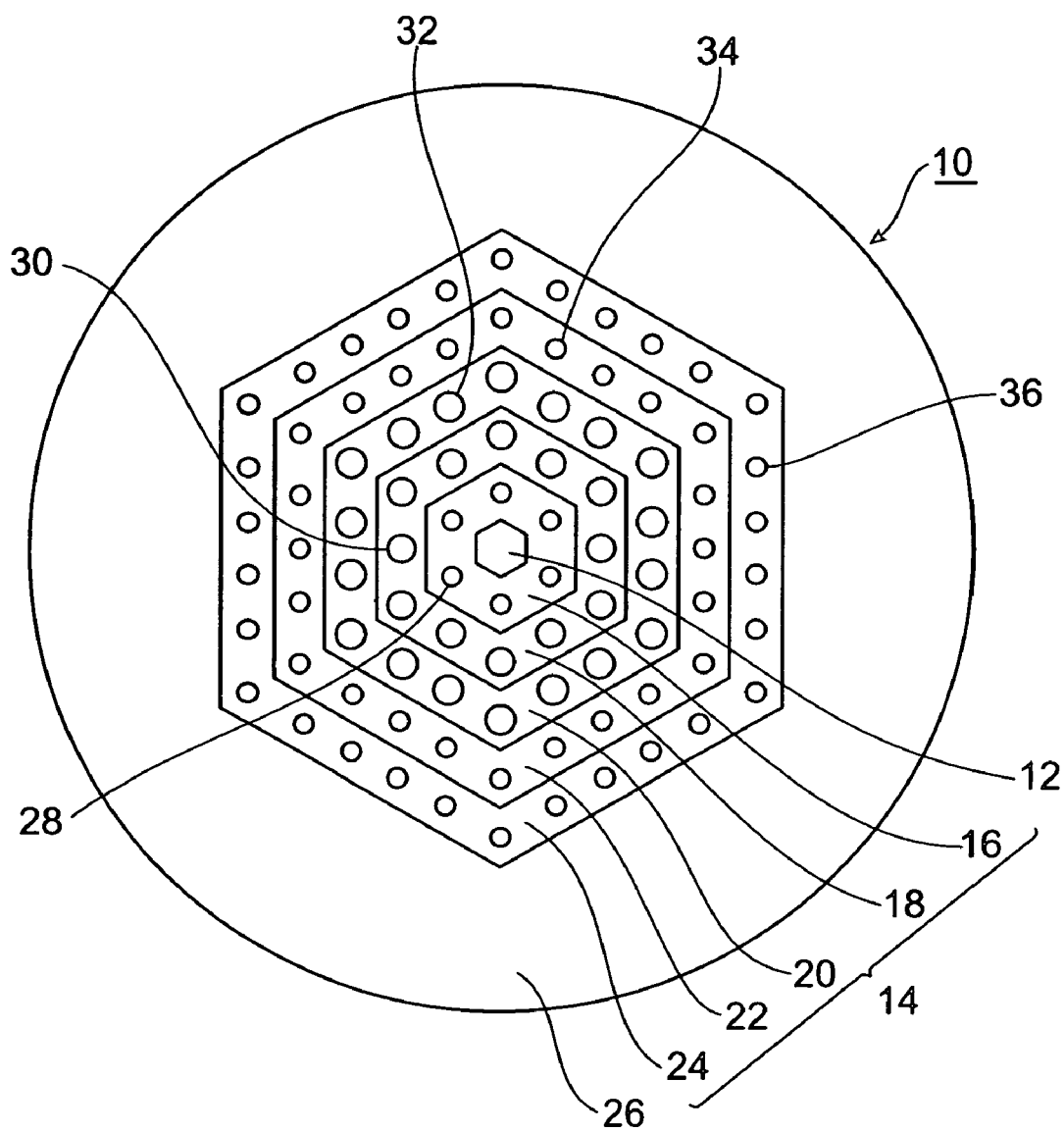
FIG. 2 is a sectional view showing a cross section of an optical fiber in accordance with first to fifth embodiments, taken along a plane perpendicular to a fiber axis (predetermined axis) X.

FIG. 1 is a view showing an optical fiber 10 in accordance with a first embodiment as seen from a side thereof. FIG. 2 is a sectional view showing a cross section of the optical fiber 10 shown in FIG. 1, taken along a plane perpendicular to a fiber axis (predetermined axis) X.

As shown in FIGS. 1 and 2, the optical fiber 10 extends along the fiber axis X. The optical fiber 10 is mainly formed from a main medium. Within the cross section perpendicular to the fiber axis X, the optical fiber 10 includes a plurality of sub-regions formed from an auxiliary medium having a refractive index different from that of the main medium.

Here, the main medium is a medium which can construct an optical fiber by itself. For example, glass and polymers can be used therefor. The auxiliary medium is a medium which is not required to construct an optical fiber by itself. For example, liquids, gases, and vacuum may be used therefor in addition to glass and polymers.

This embodiment employs glass as the main medium, and a gas (inert or active gas) as the auxiliary medium. Typical examples of the inert gas include air, $N_2$, Ar, Ne, and He. An example of the active gas is $H_2$. More specifically, this embodiment employs silica glass as the main medium, and air as the auxiliary medium. Air as the auxiliary medium is encapsulated under a predetermined pressure into voids formed in silica glass so as to extend along the fiber axis. When an active gas such as $H_2$ is employed as the auxiliary medium, an optical amplification can be realized.

For the main medium, pure silica glass (not intentionally doped with impurities) can typically be used. However, silica glass may be doped with at least one of Ge, F, Cl, B, Al, and Ti, so as to form a profile of material refractive index. With such doping, light can be guided by the profile of material refractive index, even if voids are collapsed, for example, by a fusion-splice to another optical fiber, whereby an optical fiber yielding a low fusion-splicing loss can be realized. Also, silica glass may be doped with Ge and irradiated with ultraviolet rays, so as to form a grating. This forms a fiber grating device, which can be utilized as an optical filter or optical power equalizer. Also, the silica glass may be doped with at least one of Ge, P, N, and Bi, so as to enhance nonlinear refractive index. This can lower the optical power required for generating supercontinuum light, and change the Raman scattering spectrum so as to realize an optical fiber suitable as a Raman amplification medium over a wide band. When silica glass is doped with at least one of Er, Yb, Nd, and Pr, an optical amplification characteristic can be realized.

With reference to FIG. 2, the optical fiber 10 will further be explained. A core region 12 including no voids is disposed at the center of the optical fiber 10. A cladding region 14 is provided so as to surround the core region 12. The cladding region 14 comprises a first region 16 surrounding the core region 12, a second region 18 surrounding the first region 16, a third region 20 surrounding the second region 18, a fourth region 22 surrounding the third region 20, and a fifth region 24 surrounding the fourth region 22. An outer peripheral region 26 is provided at the outer periphery of the fifth region 24. The first to fifth regions 16 to 24 and the outer peripheral region 26 are disposed concentrically with the fiber axis X. The first region 16 includes 6 voids 28. The second region 18 includes 12 voids 30. The third region 20 includes 18 voids 32. The fourth region 22 includes 24 voids 34. The fifth region 24 includes 30 voids 36. The outer peripheral region 26 includes no voids. The voids 28 to 36 are substantially disposed on lattice points of a hexagonal lattice, while yielding the same pitch Λ between adjacent voids. Therefore, the voids included in each of the first to fifth regions 16 to 24 are arranged in a hexagonal form in a plane perpendicular to the fiber axis X in the optical fiber 10.

The voids 28 to 36 have sizes adjusted to desirable values. Letting n[0] be the average refractive index of the core region 12, and n[k] (k=1, 2, 3) be the average refractive index of the k-th region 16 to 20 included in the cladding region 14, this optical fiber satisfies the relationship of $$n[i]>n[i+1] \quad (\forall i=0, 1, 2) \tag{1}$$

Here, "$\forall i=0, 1, 2$" means that the formula is satisfied with any value taken from 0, 1, and 2.

Here, the average refractive index $n_{avg}$ of a region constituted by M kinds of medium j (j=1, ..., M) is defined by $$n_{avg} = \left\{ \frac{\left\{ \sum_{j=1}^{M} N^2[j]f[j] \right\}}{\left\{ \sum_{j=1}^{M} f[j] \right\}} \right\}^{1/2} \tag{2}$$

where N[j] is the refractive index of the medium j, and f[j] is the volume thereof.

Preferably, in the optical fiber 10 in accordance with this embodiment in particular, the cladding region 14 includes the fourth region 22 surrounding the third region 20, whereas the average refractive index n[4] of the fourth region 22 and the average refractive index n[3] of the third region 20 satisfy the relationship of $$n[3]<n[4]. \tag{3}$$

Preferably, the optical fiber 10 in accordance with this embodiment exhibits a dispersion nonflatness of at least 0 ps/nm$^2$/km but not greater than 0.003 ps/nm$^2$/km at zero dispersion in a predetermined wavelength band having a width of at least 50 nm but not greater than 100 nm.

Here, the dispersion nonflatness U in a wavelength band $\lambda_1$ to $\lambda_2$ is represented by $$U=(D_{max}-D_{min})/|\lambda_2-\lambda_1| \tag{4}$$

where $D_{max}$ and $D_{min}$ are the maximum and minimum values of chromatic dispersion in the wavelength band $\lambda_1$ to $\lambda_2$, respectively. In particular, it is referred to as dispersion nonflatness at zero dispersion when $D_{min}<0<D_{max}$.

An example of sizes of the voids 28 to 36 in the optical fiber 10 having the structure mentioned above will now be listed. For example, the voids 28, 30, 32, 34, and 36 have respective diameters of 0.49 µm, 0.706 µm, 0.86 µm, 0.60 µm, and 0.60 µm. The pitch Λ between voids adjacent to each other is 1.6 µm. Therefore, assuming that silica glass and air have refractive indices of 1.444 and 1, respectively, the average refractive index n[0] of the core region 12 is 1.444, whereas the first to third regions 16 to 20 exhibit respective average refractive indices n[1], n[2], and n[3] of 1.4117, 1.3761, and 1.3419, thus satisfying the above-mentioned expression (1). The fourth region 22 exhibits an average refractive index n[4] of 1.3953, thereby satisfying the above-mentioned expression (3). The fifth region 22 exhibits an average refractive index n[5] of 1.3953, whereas the outer peripheral region 26 shows an average refractive index of 1.444.

Figure 3:
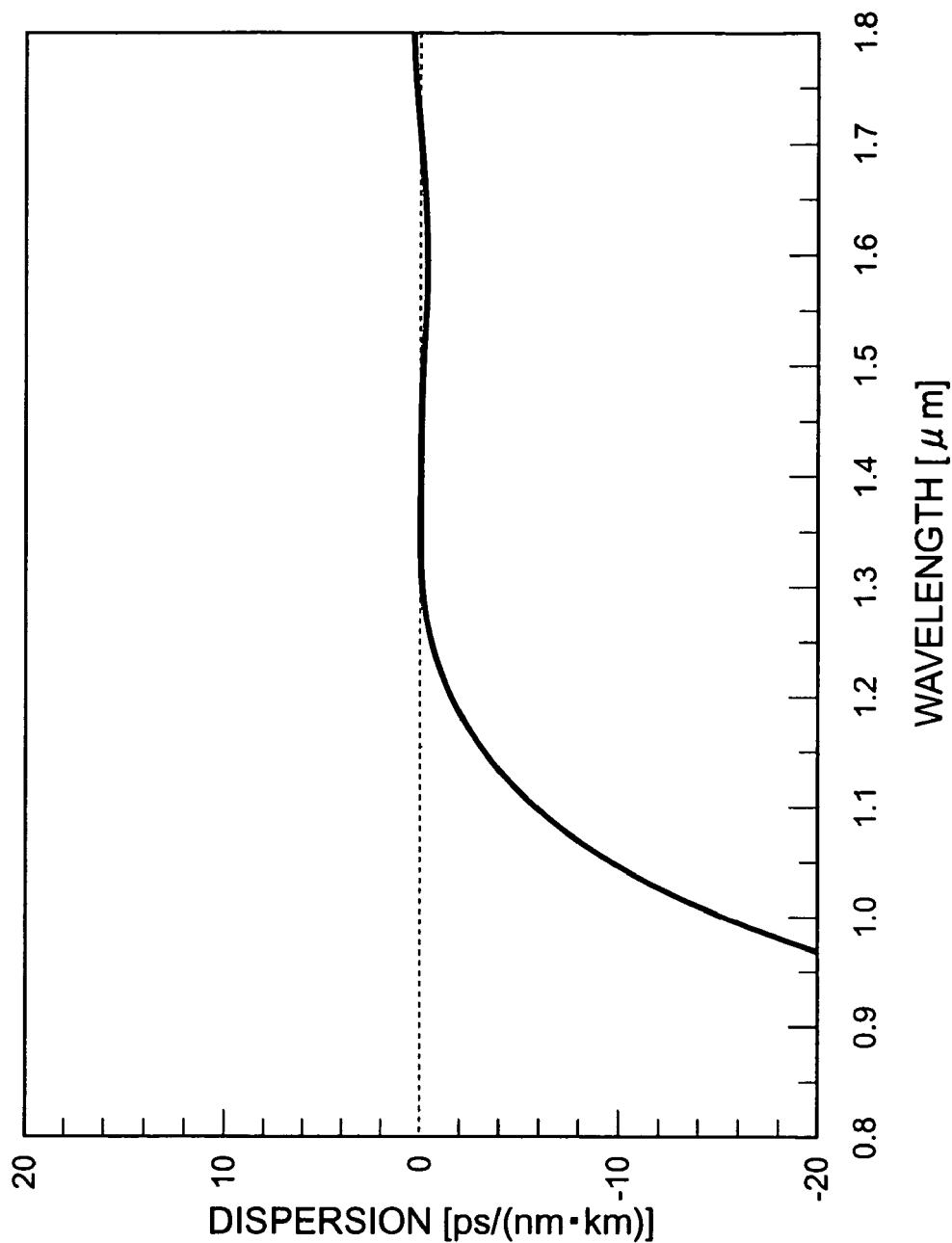
FIG. 3 is a graph showing an example of chromatic dispersion characteristic of the optical fiber in accordance with the first embodiment.

FIG. 3 is a graph showing the chromatic dispersion characteristic of the optical fiber 10 exemplified above. As shown in FIG. 3, the chromatic dispersion falls within the range from −0.5 ps/nm/km to +0.5 ps/nm/km within the wavelength range from 1.3 μm to 1.8 μm, whereas the dispersion nonflatness at zero dispersion is at least 0 ps/nm²/km but not greater than 0.002 ps/nm²/km.

Two methods of making the optical fiber 10 having the above-mentioned structure will now be explained.

Figure 4:
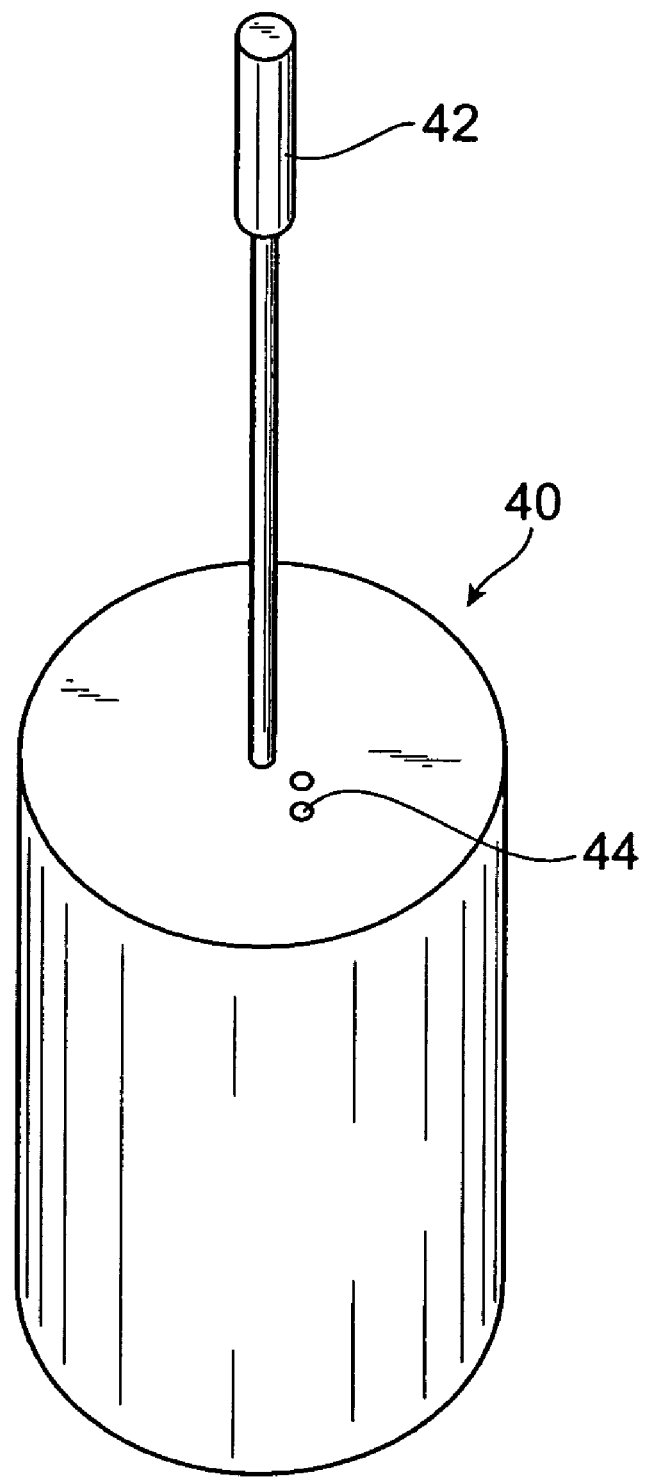
FIG. 4 is a view for explaining a method of making an optical fiber.
Figure 5:
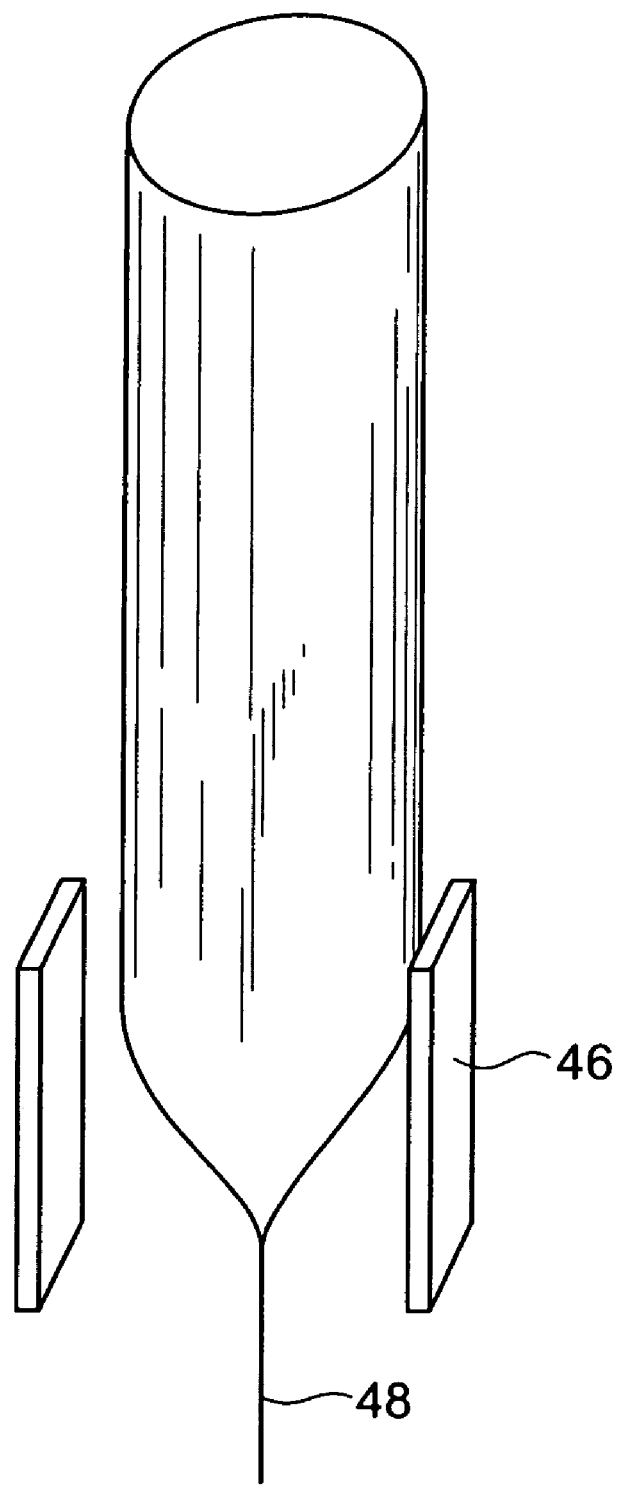
FIG. 5 is a view for explaining the method of making an optical fiber.

In the first method, as shown in FIG. 4, a cylindrical sintered glass body 40 having an outer diameter of 60 mm is formed with 6, 12, 18, and 54 (24+30) holes 44 having diameters of 2.12 mm, 3.05 mm, 3.72 mm, and 2.59 mm, respectively, with a boring device 42 at equally spaced intervals, so as to be placed on lattice points of hexagonal lattices. Subsequently, the glass sintered body 40 is heated so that its outer diameter is reduced to 5 mm, and then it is integrated with a glass tube having an inner diameter of about 5 mm and an outer diameter of 36 mm, so as to form a preform. Then, as shown in FIG. 5, the preform is drawn while being heated with a heater 46, so as to yield an optical fiber 48 having an outer diameter of 100 μm. After forming the holes 44 in the glass sintered body 40, inner faces of the holes 44 can be etched, so as to make an optical fiber yielding low absorption loss and scattering loss due to impurities and roughness in the surfaces of holes.

Figure 6:
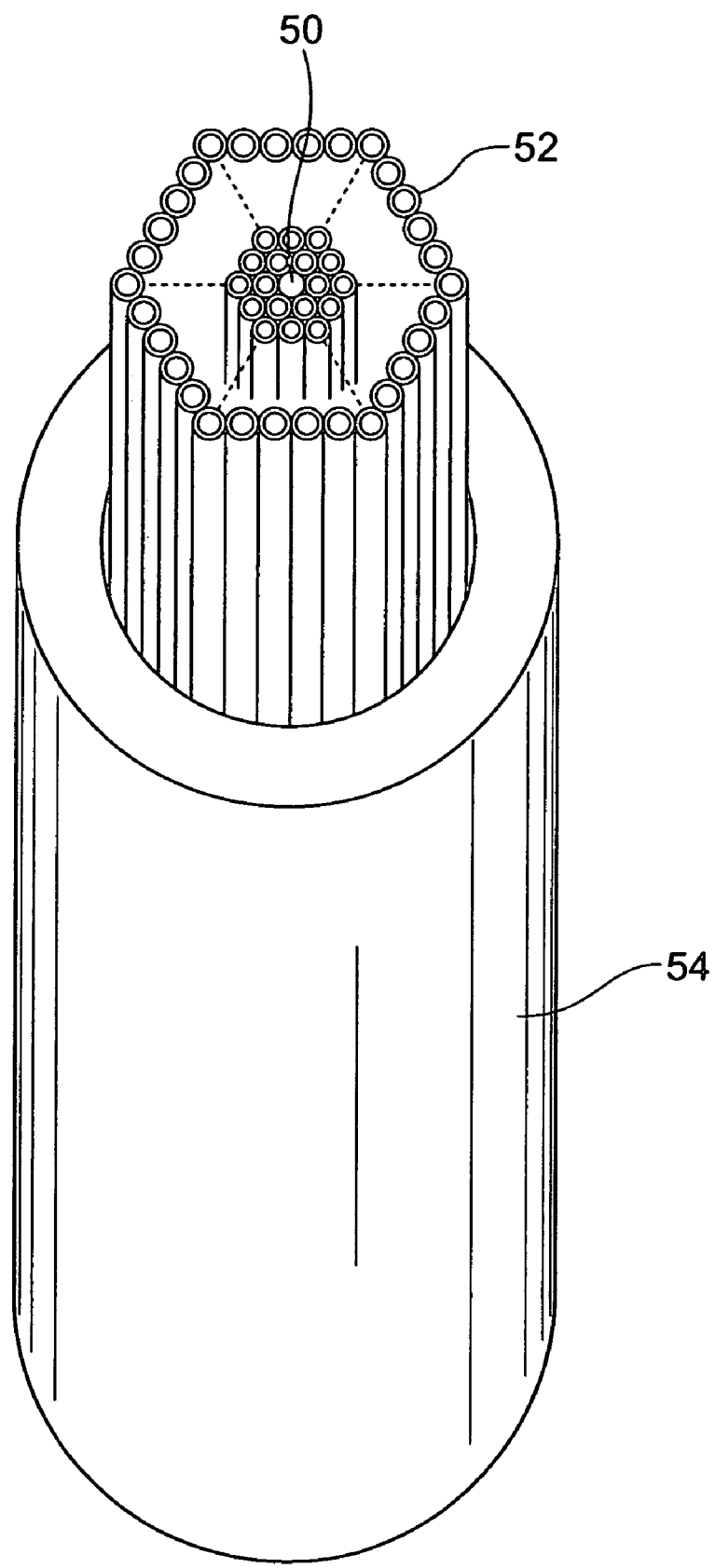
FIG. 6 is a view for explaining another method of making an optical fiber.

In the second method as shown in FIG. 6, on the other hand, a glass rod 50 having an outer diameter of 0.72 mm, and 6, 12, 18, and 54 (24+) four kinds of glass capillary tubes 52 having inner/outer diameters of 0.22 mm/0.72 mm, 0.32 mm/0.72 mm, 0.39 mm/0.72 mm, and 0.27 mm/0.72 mm, respectively, are bundled together and put into an overcladding tube 54 having an outer diameter of 36 mm, so as to form a preform. This preform is drawn, so as to yield an optical fiber having an outer diameter of 80 μm.

Operations and effects of the optical fiber 10 in accordance with this embodiment will now be explained.

In the optical fiber 10 in accordance with this embodiment, the cladding region 14 comprises the three layer regions 16 to 20 satisfying the relationship of the above-mentioned expression (1), and consequently, the spread of light into outer regions increases as the wavelength is longer. Hence, the dispersion characteristic at a shorter wavelength is influenced by an inner part of the cladding region 14, whereas the dispersion characteristic at a longer wavelength is influenced by an outer part of the cladding region 14. Therefore, the degree of freedom in adjusting the chromatic dispersion and the adjustable wavelength range increase, and the sensitivity of dispersion nonflatness to scale fluctuations in the waveguide structure can be reduced. As a result, the dispersion nonflatness caused by fiber diameter fluctuations along the fiber axis X can be suppressed. Also, such a structure of the optical fiber 10 is suitable for making a plurality of kinds of optical fibers having different average dispersion values with a flattened dispersion by drawing them from a preform while changing the fiber diameter. This enables production of diversified products while suppressing the increase in cost. Further, such an optical fiber structure is suitable for drawing an optical fiber from perform while changing the fiber diameter with an amplitude above a predetermined value in a longitudinal direction, thereby easily making a dispersion-managed fiber usable over a wide band.

Preferably, in the optical fiber 10 in accordance with this embodiment in particular, the cladding region 14 includes the fourth region 22 surrounding the third region 20, whereas the average refractive index n[4] of the fourth region 22 and the average refractive index n[3] of the third region 20 satisfy the relationship of the above-mentioned expression (3). This enhances the spread of light into the outer part of the cladding region 14 at a longer wavelength, thus improving the controllability of dispersion characteristic at a longer wavelength, thereby making it possible to realize a flattened dispersion characteristic over a wider wavelength band.

Preferably, in the optical fiber 10 in accordance with this embodiment, the dispersion nonflatness at zero dispersion is at least 0 ps/nm²/km but not greater than 0.003 ps/nm²/km in a predetermined wavelength band having a width of at least 50 nm but not greater than 1000 nm. This can suppress the waveform distortion when transmitting an optical signal occupying a wide wavelength band, thus making it possible to realize an optical fiber suitable for transmitting short-pulse light.

A second embodiment of the present invention will now be explained. Here, constituents identical to those explained in the above-mentioned first embodiment will be referred to with numerals identical thereto, without repeating their overlapping descriptions.

The optical fiber 10 in accordance with the second embodiment is the same as that in accordance with the above-mentioned first embodiment in terms of media and arrangement of voids, but differs therefrom in sizes of individual parts.

Sizes and pitches of the voids 28 to 34 are adjusted to desirable values. Letting n[0] be the average refractive index of the core region 12, and n[k] (k=1, 2, 3, 4) be the average refractive index of the k-th region 16 to 22 included in the cladding region 14, the relationship of $$n[i] > n[i+1] \ (\forall i=0, 1, 2, 3) \tag{5}$$

is satisfied.

An example of ratios of diameters $d_1$ to $d_4$ of the voids 28 to 34 to the pitch $\Lambda$ in the optical fiber 10 having the above-mentioned structure will be listed. For example, $d_1/\Lambda=0.30625$, $d_2/\Lambda=0.44125$, $d_3/\Lambda=0.5375$, and $d_4/\Lambda=0.9375$. In the voids 36 in the fifth region 24, $d_5/\Lambda=0.9375$. Therefore, assuming that silica glass and air have refractive indices of 1.444 and 1, respectively, the average refractive index n[0] of the core region 12 is 1.444, whereas the first to fourth regions 16 to 22 exhibit respective average refractive indices n[1], n[2], n[3], and n[4] of 1.4117, 1.3761, 1.3419, and 1.1046, thus satisfying the above-mentioned expression (5). The fifth region 24 exhibits an average refractive index n[5] of 1.1046, whereas the outer peripheral region 26 shows an average refractive index of 1.444.

Figure 7:
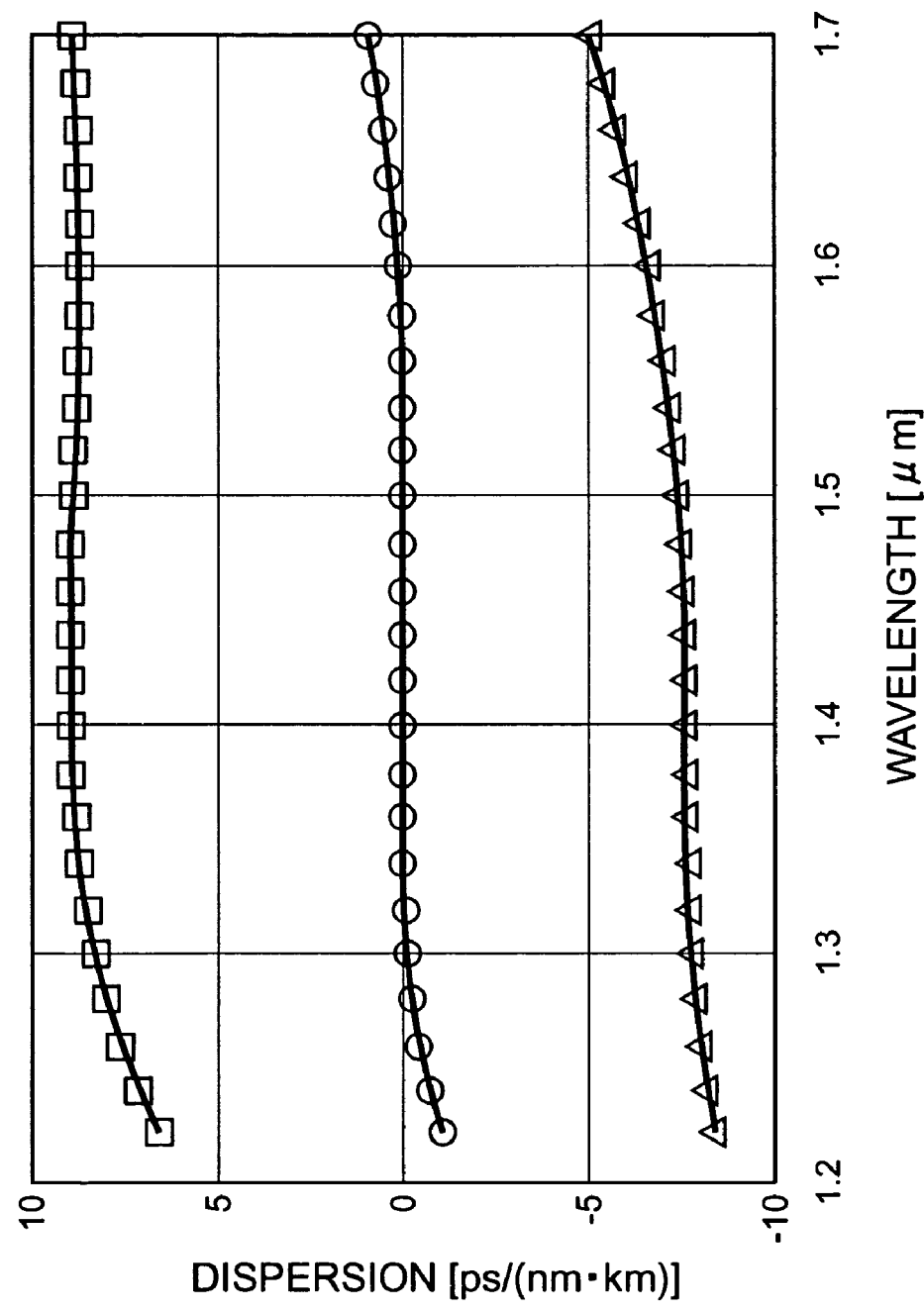
FIG. 7 is a graph showing three examples of chromatic dispersion characteristic of optical fibers in accordance with the second embodiment.

FIG. 7 is a graph showing chromatic dispersion characteristics of three kinds of optical fibers (optical fibers 10A, 10B, 10C) when the void pitch $\Lambda$ is 1.595 μm, 1.73 μm, and 1.495 μm, respectively.

Within the wavelength range from 1.26 μm to 1.66 μm, the optical fiber 10A (indicated by circles in FIG. 7) exhibits a chromatic dispersion of −0.44 ps/nm/km to +0.53 ps/nm/km, and a dispersion nonflatness of 0.0024 ps/nm²/km at zero dispersion. Thus, the dispersion nonflatness at zero dispersion is preferably at least 0 ps/nm²/km but not greater than 0.003 ps/nm²/km in a predetermined wavelength band having a width of at least 50 nm but not greater than 1000 nm. This can suppress the waveform distortion when transmitting an optical signal occupying a wide wavelength band, thus making it possible to realize an optical fiber suitable for transmitting short-pulse light.

Within the wavelength range from 1.26 µm to 1.66 µm, the optical fiber 10B (indicated by squares in FIG. 7) exhibits a chromatic dispersion of +7.62 ps/nm/km to +9.00 ps/nm/km, and a dispersion nonflatness of 0.0034 ps/nm$^2$/km. Within the wavelength range from 1.4 µm to 1.7 µm, the optical fiber 10B exhibits a chromatic dispersion of +8.74 ps/nm/km to +9.00 ps/nm/km, and a dispersion nonflatness of 0.00088 ps/nm$^2$/km. Thus, preferably, the dispersion is at least 0 ps/nm$^2$/km but not greater than 0.004 ps/nm$^2$/km in a predetermined wavelength band having a width of at least 50 nm but not greater than 1000 nm whereas the chromatic dispersion in the predetermined wavelength band is an anomalous dispersion having an average value of at least 0 ps/nm/km but not greater than +20 ps/nm/km. This can realize an optical fiber suitable for soliton transmission over a wide band, wavelength-division multiplexing transmission (WDM transmission) over a wide band, and supercontinuum light generation over a wide band.

Within the wavelength range from 1.26 µm to 1.66 µm, the optical fiber 10C (indicated by triangles in FIG. 7) exhibits a chromatic dispersion of −7.90 ps/nm/km to −5.67 ps/nm/km, and a dispersion nonflatness of 0.0056 ps/nm$^2$/km. Within the wavelength range from 1.28 µm to 1.6 µm, the optical fiber 10C exhibits a chromatic dispersion of −7.78 ps/nm/km to −6.50 ps/nm/km, and a dispersion nonflatness of 0.0040 ps/nm$^2$/km. Thus, preferably, the dispersion is at least 0 ps/nm$^2$/km but not greater than 0.006 ps/nm$^2$/km in a predetermined wavelength band having a width of at least 50 nm but not greater than 1000 nm whereas the chromatic dispersion in the predetermined wavelength band is a normal dispersion having an average value of at least −20 ps/nm/km but not grater than 0 ps/nm/km. This can realize an optical fiber suitable for WDM transmission over a wide band and supercontinuum light generation over a wide band.

Figure 8:
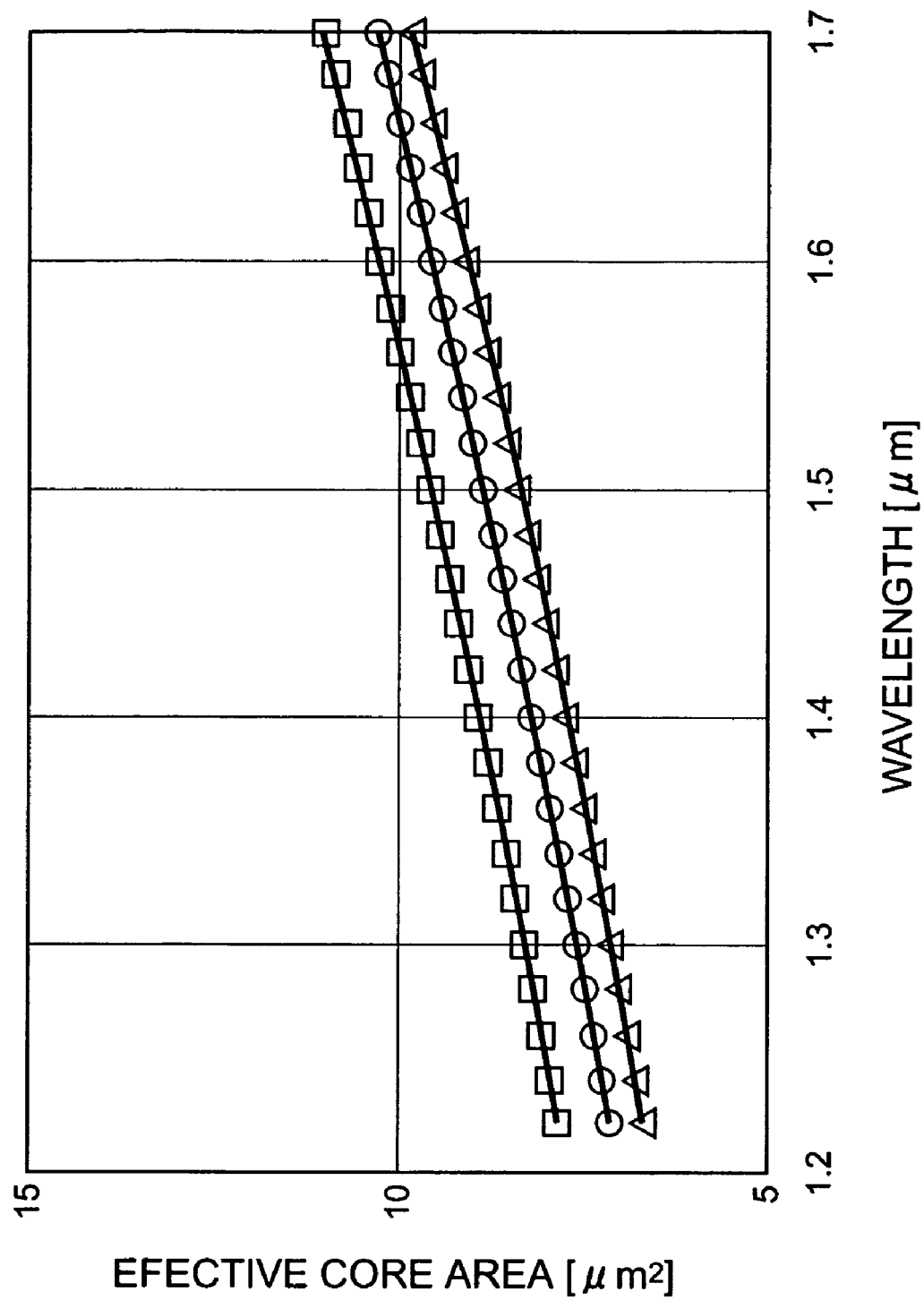
FIG. 8 is a graph showing wavelength dependence characteristics of effective core area in the three optical fibers shown in FIG. 7.

As shown in FIG. 8, each of the optical fibers 10A to 10C (indicated by circles, squares, and triangles, respectively, in FIG. 8) has an effective core area of 6 µm$^2$ to 12 µm$^2$ in the wavelength band from 1.2 µm to 1.7 µm. Therefore, the optical fibers 10A to 10C are suitable for applications of nonlinear optical effects such as supercontinuum light generation.

A third embodiment of the present invention will now be explained. Here, constituents identical to those explained in the above-mentioned first and second embodiments will be referred to with numerals identical thereto, without repeating their overlapping descriptions.

Figure 9:
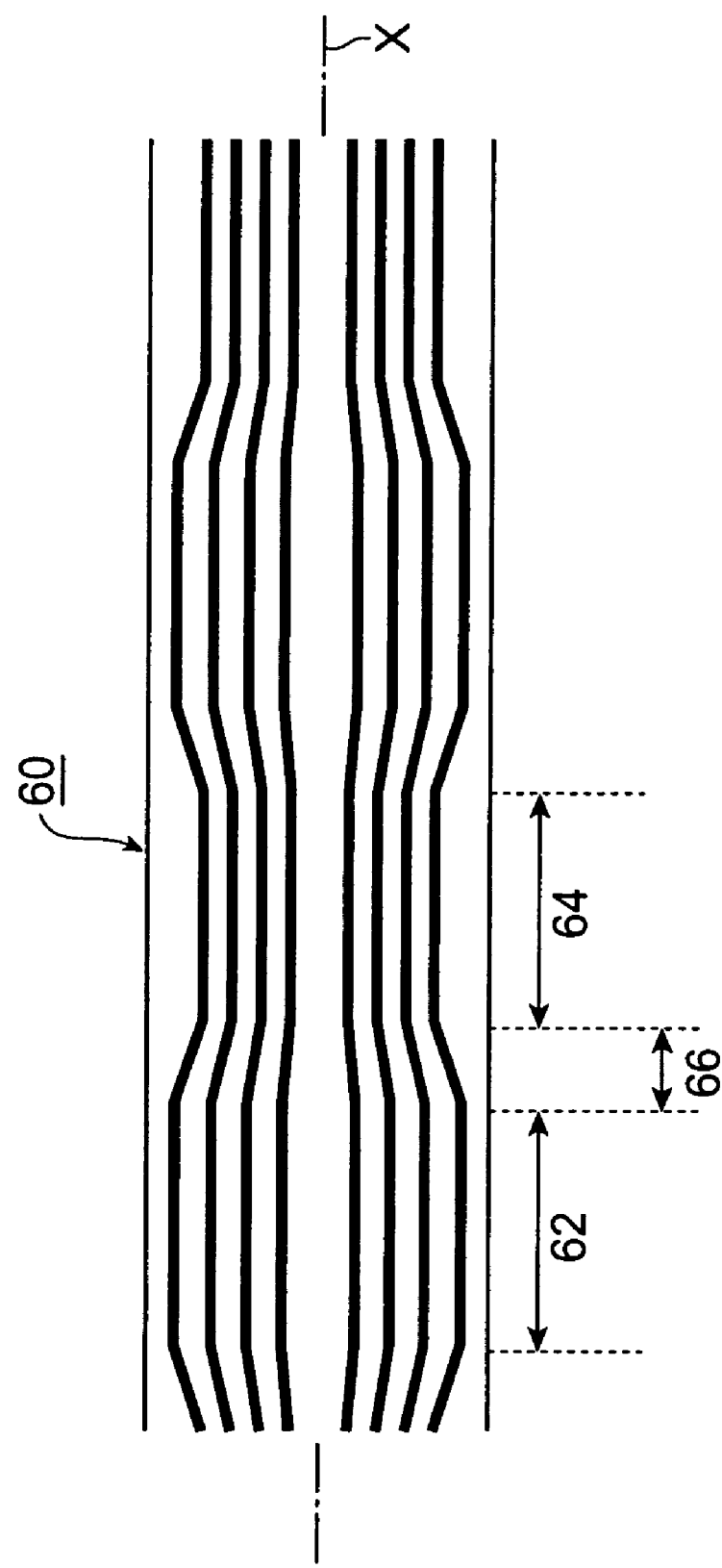
FIG. 9 is a view schematically showing the structure of an optical fiber in accordance with the third embodiment.

The optical fiber 10 having a uniform structure in a direction along the optical fiber 10 is explained in the above-mentioned first and second embodiments. By contrast, as shown in FIG. 9, the optical fiber 60 in accordance with the third embodiment comprises a first category fiber segment 62, a second category fiber segment 64, and a transitional segment 66 connecting the first and second category fiber segments 62, 64. The first category fiber segment 62 exhibits a dispersion nonflatness of at least 0 ps/nm$^2$/km but not greater than 0.007 ps/nm$^2$/km in a predetermined wavelength band having a width of at least 50 nm but not greater than 1000 nm, whereas the chromatic dispersion in the predetermined wavelength band is an anomalous dispersion having an average value of at least +1 ps/nm/km but not greater than +30 ps/nm/km. The second category fiber segment 64 exhibits a dispersion nonflatness of at least 0 ps/nm$^2$/km but not greater than 0.007 ps/nm$^2$/km in the predetermined wavelength band, whereas the chromatic dispersion in the predetermined wavelength band is a normal dispersion having an average value of at least −30 ps/nm/km but not greater than −1 ps/nm/km.

The optical fiber 10B explained in the second embodiment can be employed for the first category fiber segment 62. The optical fiber 10C explained in the second embodiment can be employed for the second category fiber segment 64.

In the transitional segment 66, the cross-sectional structure of the fiber continuously changes along the fiber axis X between the first category fiber segment 62 and the second category fiber segment 64 while substantially keeping a proportional form.

A set of such first category fiber segment 62, transitional segment 66, second category fiber segment 64, and transitional segment 66 may form a unit segment, and a fiber may be constituted by a plurality of unit segments aligning along the fiber axis X. In this case, the length L1 of the first category fiber segment 62 and the length L2 of the second category fiber segment 64 preferably satisfy L1:L2=6.8:8.3. Typically, L1 and L2 are 500 m to 50 km.

In the optical fiber 60, the average value of chromatic dispersion in the wavelength band from 1.26 µm to 1.66 µm is −0.91 ps/nm/km to +0.84 ps/nm/km, whereas the dispersion nonflatness at zero dispersion is 0.0044 ps/nm$^2$/km.

As such, the optical fiber 60 in accordance with this embodiment can realize a dispersion-managed fiber which can suppress the transmission quality deterioration caused by nonlinear optical effects and chromatic dispersion over a wide band in the WDM transmission and soliton transmission.

A fourth embodiment of the present invention will now be explained. Here, constituents identical to those explained in the above-mentioned first to third embodiments will be referred to with numerals identical thereto, without repeating their overlapping descriptions.

Figure 10:
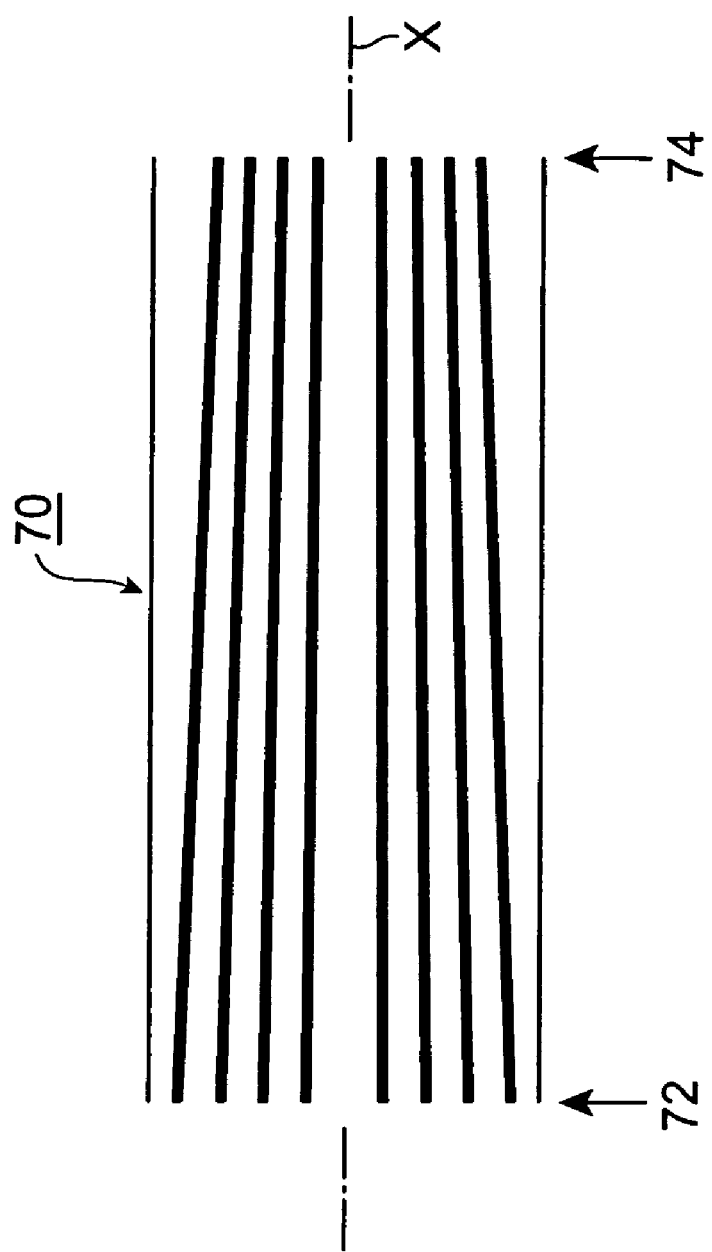
FIG. 10 is a view schematically showing the structure of an optical fiber in accordance with the fourth embodiment.

The optical fiber 10 having a uniform structure in a direction along the fiber axis X is explained in the above-mentioned first and second embodiments. The optical fiber 60 having two kinds of structures is explained in the third embodiment. By contrast, as shown in FIG. 10, the cross-sectional structure of the optical fiber 70 in accordance with the fourth embodiment continuously changes along the fiber axis X from one end 72 to the other end 74 of the optical fiber 70.

In the optical fiber 70, the dispersion nonflatness is at least 0 ps/nm$^2$/km but not greater than 0.007 ps/nm$^2$/km in a predetermined wavelength band having a width of at least 50 nm but not greater than 1000 nm, whereas the chromatic dispersion in the predetermined wavelength band at one end 72 is an anomalous dispersion of at least +1 ps/nm/km but not greater than +30 ps/nm/km. The chromatic dispersion continuously decreases from one end 72 to the other end 74, so that the chromatic dispersion at the other end 74 is not greater than half of that at one end 72. As the fiber structure at one end 72, the cross-sectional structure of the optical fiber 10B explained in the above-mentioned second embodiment can be used. As the fiber structure at the other end 74, the cross-sectional structure of the optical fiber 10A explained in the above-mentioned second embodiment can be used.

In the optical fiber 70, the chromatic dispersion within the wavelength range from 1.26 µm to 1.66 µm changes from about 8 ps/nm/km to 0 ps/nm/km.

As described above, the optical fiber 70 in accordance with this embodiment can realize a dispersion-decreasing optical fiber suitable for generating supercontinuum light with a high coherence over a wide band.

A fifth embodiment of the present invention will now be explained. Constituents identical to those explained in the above-mentioned first to fourth embodiments will be referred to with numerals identical thereto, without repeating their overlapping descriptions.

The optical fibers 10D to 10F in accordance with the fifth embodiment are the same as that in accordance with the above-mentioned first embodiment in terms of media and arrangement of voids, but differ therefrom in sizes of individual parts.

Sizes and pitches of the voids 28 to 34 are adjusted to desirable values. Letting n[0] be the average refractive index of the core region 12, and n[k] (k=1, 2, 3, 4) be the average refractive index of the k-th region 16 to 22 included in the cladding region 14, the optical fiber 10D satisfies the relationship of $$n[i] > n[i+1] \quad (\forall i = 0, 1, 2, 3) \quad (6)$$

On the other hand, the optical fibers 10E, 10F satisfy the relationship of $$n[0] > n[1], n[1] < n[2], \text{ and } n[i] > n[i+1] \quad (\forall i = 2, 3). \quad (7)$$

An example of ratios of diameters $d_1$ to $d_4$ of the voids 28 to 34 to the pitch $\Lambda$ in the optical fibers 10D to 10F having the above-mentioned structures will be listed. For example, $d_1/\Lambda = 0.42$, $d_2/\Lambda = 0.43$, $d_3/\Lambda = 0.63$, and $d_4/\Lambda = 0.95$ in the optical fiber 10D. Therefore, assuming that silica glass and air have refractive indices of 1.444 and 1, respectively, the average refractive index n[0] of the core region 12 is 1.444, whereas the first to fourth regions 16 to 22 exhibit respective average refractive indices n[1], n[2], n[3], and n[4] of 1.3826, 1.3796, 1.3017, and 1.0941, thus satisfying the above-mentioned expression (6).

For example, $d_1/\Lambda = 0.50$, $d_2/\Lambda = 0.40$, $d_3/\Lambda = 0.60$, and $d_4/\Lambda = 0.95$ in the optical fiber 10E. Therefore, n[0] =1.444, n[1]=1.3561, n[2]=1.3884, n[3]=1.3156, and n[4]=1.0941, thus satisfying the above-mentioned expression (7).

For example, $d_1/\Lambda = 0.60$, $d_2/\Lambda = 0.41$, $d_3/\Lambda = 0.60$, and $d_4/\Lambda = 0.95$ in the optical fiber 10F. Therefore, n[0] =1.444, n[1]=1.3156, n[2]=1.3884, n[3]=1.3156, and n[4]=1.0941, thus satisfying the above-mentioned expression (7). In each of the optical fibers 10D to 10F, the average refractive index n[5] of the fifth region 24 equals n[4] whereas the average refractive index of the outer region 26 is 1.444.

Figure 11:
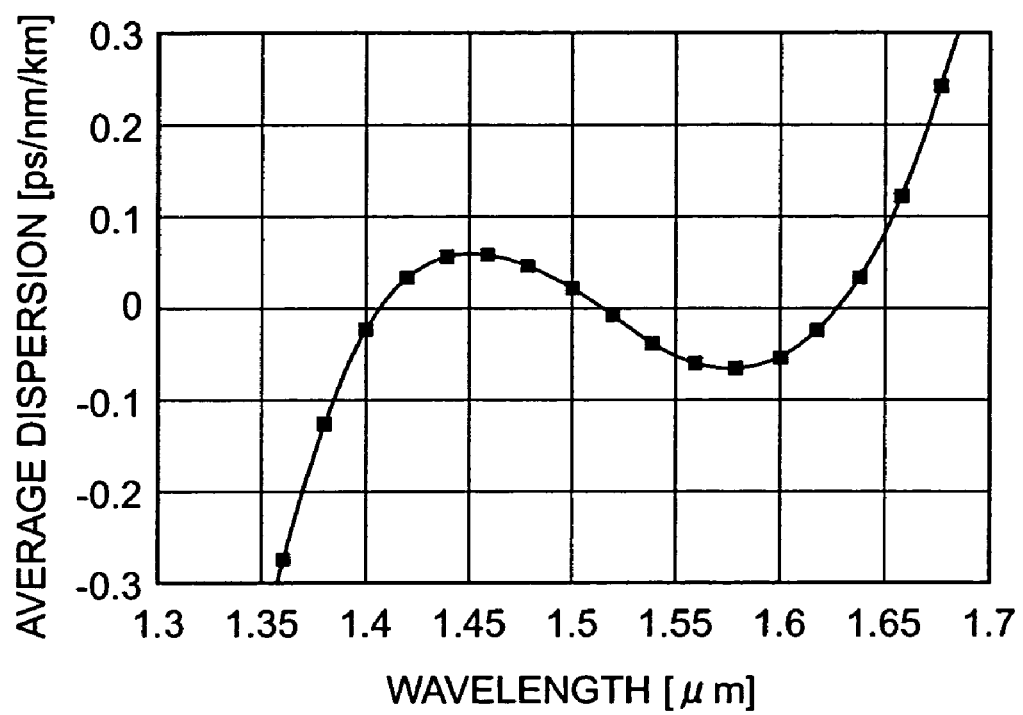
FIG. 11 is a graph showing an example of chromatic dispersion characteristic of a transmission line including an optical fiber in accordance with the fifth embodiment.

FIG. 11 is a graph showing the average chromatic dispersion of the whole transmission line constituted by the optical fiber 10D in which the pitch $\Lambda$ of voids is 1.5 $\mu$m and a single-mode optical fiber exhibiting the chromatic dispersion F($\lambda$) represented by the expression of $$F(\lambda) = a\lambda^{-4} + b\lambda^{-2} + c + d\lambda^2 + e\lambda^4 \quad (8)$$

$a = -24.495 \text{ [ps/nm/km/}\mu\text{m}^{-4}]$ $b = -54.564 \text{ [ps/nm/km/}\mu\text{m}^{-2}]$ $c = 35.069 \text{ [ps/nm/km]}$ $d = 1.8867 \text{ [ps/nm/km/}\mu\text{m}^2]$ $e = 0.80887 \text{ [ps/nm/km/}\mu\text{m}^4] \quad (8)$ which are combined such that the ratio of their lengths is x:1. The average chromatic dispersion G($\lambda$, x) in the whole transmission line is given by the following expression (9):

$$G(\lambda, x) = |(F(\lambda) + xD(\lambda))/(1+x)| \quad (9)$$

Here, x is chosen so as to become 0.544.

When the optical fiber 10D is combined with a single-mode optical fiber at a length ratio of 1:0.544 so as to construct a transmission line, the absolute value of average chromatic dispersion in the transmission line can be made smaller than 0.25 ps/nm/km within the wavelength range from 1.38 $\mu$m to 1.66 $\mu$m. Thus, when the optical fiber 10D is combined with a single-mode optical fiber having the chromatic dispersion represented by the above-mentioned expression (8) at a predetermined length ratio, the absolute value of average chromatic dispersion in the whole transmission line can be made at least 0 ps/nm/km but smaller than 0.25 ps/nm/km in a predetermined wavelength band having a width of at least 250 nm but not greater than 1000 nm. Therefore, an optical fiber suitable for dispersion compensation over a wide band can be realized.

Figure 12:
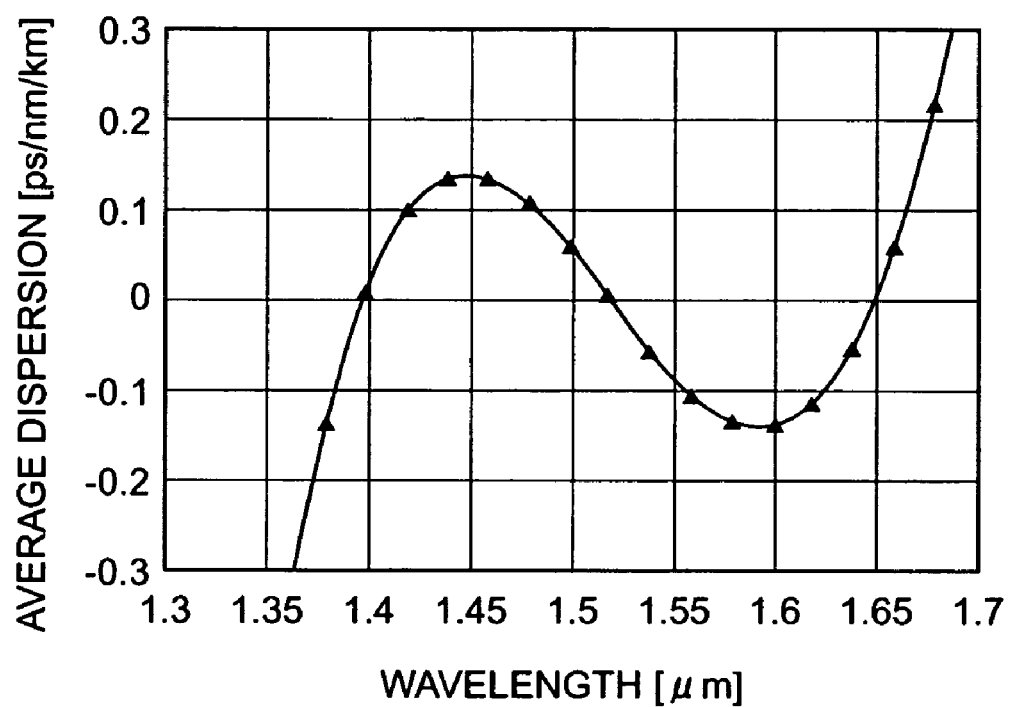
FIG. 12 is a graph showing an example of chromatic dispersion characteristic of a transmission line including an optical fiber in accordance with the fifth embodiment.

FIG. 12 is a graph showing the average chromatic dispersion of the whole transmission line constituted by the optical fiber 10E in which the pitch $\Lambda$ of voids is 1.47 $\mu$m and a single-mode optical fiber exhibiting the chromatic dispersion F($\lambda$) represented by the above mentioned expression (8) which are combined such that the ratio of their lengths is x:1. Here, x is chosen so as to become 0.2316.

When the optical fiber 10E is combined with a single-mode optical fiber at a length ratio of 1:0.2316 so as to construct a transmission line, the absolute value of average chromatic dispersion in the transmission line can be made smaller than 0.25 ps/nm/km within the wavelength range from 1.38 $\mu$m to 1.68 $\mu$m. Thus, when the optical fiber 10E is combined with a single-mode optical fiber having the chromatic dispersion represented by the above-mentioned expression (8) at a predetermined length ratio, the absolute value of average chromatic dispersion in the whole transmission line can be made at least 0 ps/nm/km but smaller than 0.25 ps/nm/km in a predetermined wavelength band having a width of at least 250 nm but not greater than 1000 nm. Therefore, an optical fiber suitable for dispersion compensation over a wide band can be realized.

Figure 13:
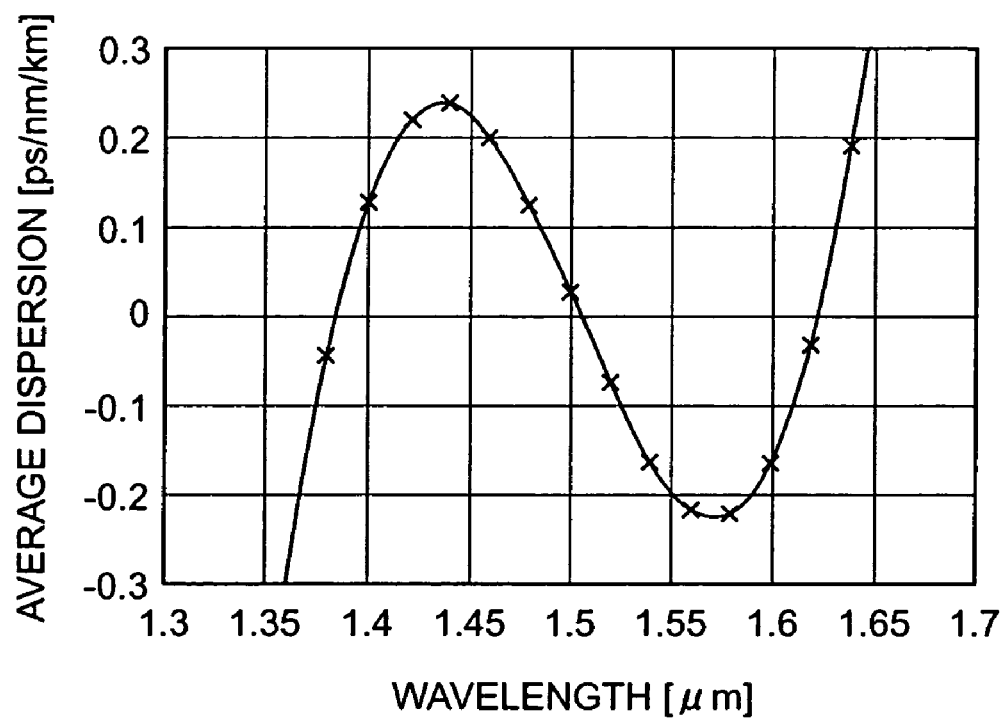
FIG. 13 is a graph showing an example of chromatic dispersion characteristic of a transmission line including an optical fiber in accordance with the fifth embodiment.

FIG. 13 is a graph showing the average chromatic dispersion of the whole transmission line constituted by the optical fiber 10F in which the pitch $\Lambda$ of voids is 1.375 $\mu$m and a single-mode optical fiber exhibiting the chromatic dispersion F($\lambda$) represented by the above mentioned expression (8) which are combined such that the ratio of their lengths is x:1. Here, x is chosen so as to become 0.096.

When the optical fiber 10F is combined with a single-mode optical fiber at a length ratio of 1:0.096 so as to construct a transmission line, the absolute value of average chromatic dispersion in the transmission line can be made smaller than 0.25 ps/nm/km within the wavelength range from 1.38 $\mu$m to 1.64 $\mu$m. Thus, when the optical fiber 10F is combined with a single-mode optical fiber having the chromatic dispersion represented by the above-mentioned expression (8) at a predetermined length ratio, the absolute value of average chromatic dispersion in the whole transmission line can be made at least 0 ps/nm/km but smaller than 0.25 ps/nm/km in a predetermined wavelength band having a width of at least 250 nm but not greater than 1000 nm. Therefore, an optical fiber suitable for dispersion compensation over a wide band can be realized.

A sixth embodiment of the present invention will now be explained. Here, constituents identical to those explained in the above-mentioned first to fifth embodiments will be referred to with numerals identical thereto, without repeating their overlapping descriptions.

Figure 14:
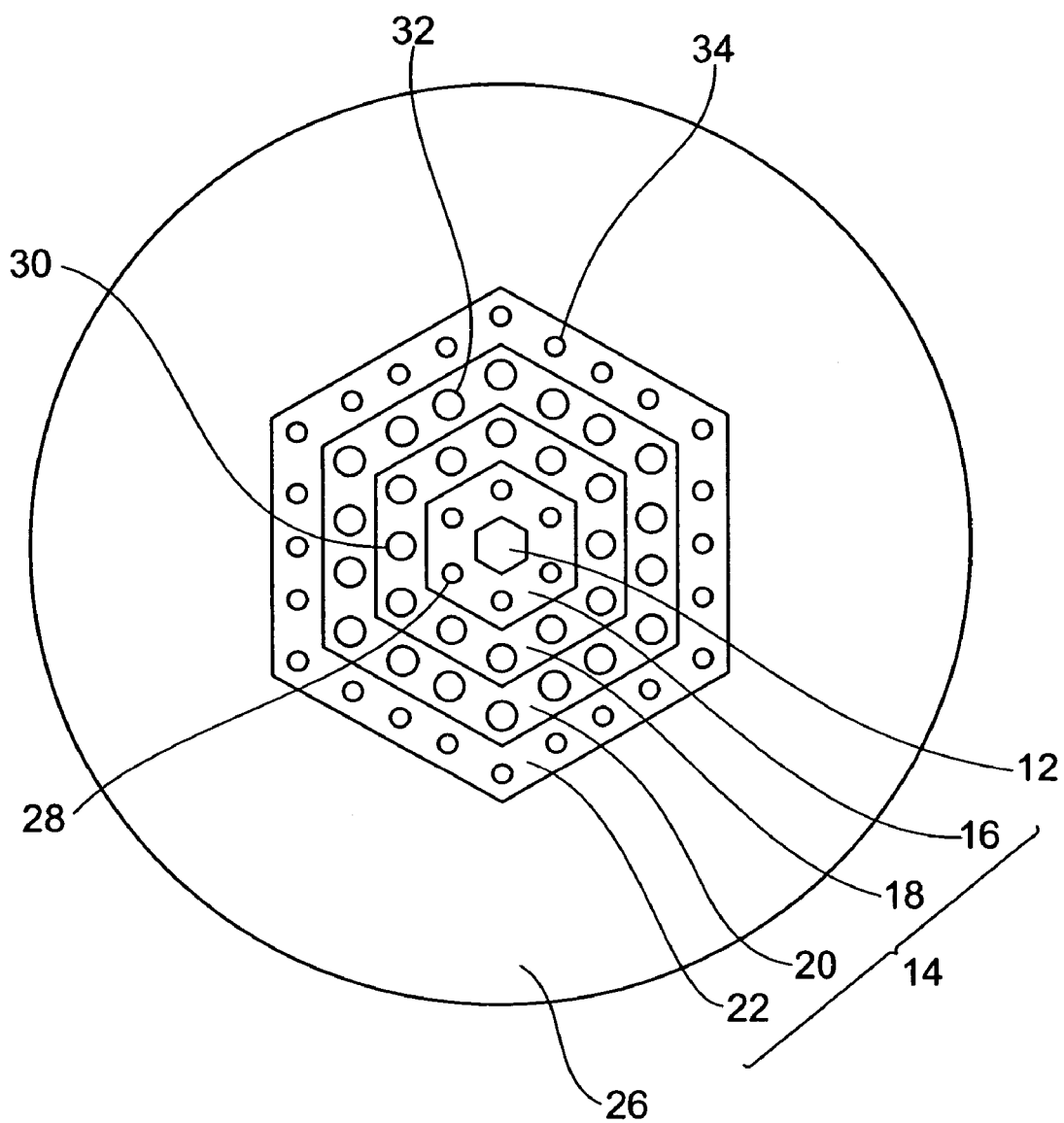
FIG. 14 is a sectional view showing a cross section of an optical fiber in accordance with sixth and seventh embodiments, taken along a plane perpendicular to a fiber axis (predetermined axis) X.

As shown in FIG. 14, the optical fiber 11 in accordance with the sixth embodiment has the same configuration as with the optical fiber 10 in accordance with the second embodiment (see FIG. 2) except that the fifth region 24 constituting the cladding region 14 is not included.

Therefore, letting n[0] be the average refractive index of the core region 12, and n[k] (k=1, 2, 3, 4) be the average refractive index of the k-th region 16 to 22 included in the cladding region 14, the above-mentioned expression (5) is satisfied.

An example of ratios of diameters $d_1$ to $d_4$ of the voids 28 to 34 to the pitch Λ in the optical fiber 10 having the above-mentioned structure will be listed. For example, $d_1/\Lambda=0.30625$, $d_2/\Lambda=0.44125$, $d_3/\Lambda=0.5375$, and $d_4/\Lambda=0.9375$. Therefore, assuming that silica glass and air have refractive indices of 1.444 and 1, respectively, the average refractive index n[0] of the core region 12 is 1.444, whereas the first to fourth regions 16 to 22 exhibit respective average refractive indices n[1], n[2], n[3], and n[4] of 1.4117, 1.3761, 1.3419, and 1.1046, thus satisfying the above-mentioned expression (5). Here, the outer peripheral region 26 shows an average refractive index of 1.444.

Here, the light confinement effected by the outermost region in the cladding region 14 becomes stronger as the difference in average refractive index between the outermost region and the core region 12 is greater, and as the radial thickness T of the outermost region is larger.

Therefore, letting T[N+1] μm be the radial thickness of the (N+1)-th region located on the outermost side in the cladding region 14, the strength of light confinement by the cladding region 14 is evaluated by the following parameter C:

$$C = T[N+1] \cdot \overline{n[0]^2 - n[N+1]^2} \qquad (10)$$

In the above-mentioned expression (10), n[0] and n[N+1] are respective average refractive indices of the core region 12 and (N+1)-th region. Here, the optical fiber 11 in accordance with this embodiment satisfies the relationship of

C>1.0.

Namely, since the outermost layer of the cladding region 14 is the fourth region 22, this embodiment satisfies the relationship of $$C = T[4] \cdot \overline{n[0]^2 - n[4]^2} > 1.0.$$

Therefore, light can fully be confined by the cladding region 14, whereby the optical confinement loss can be reduced. As a result, the transmission loss can be lowered.

Figure 15:
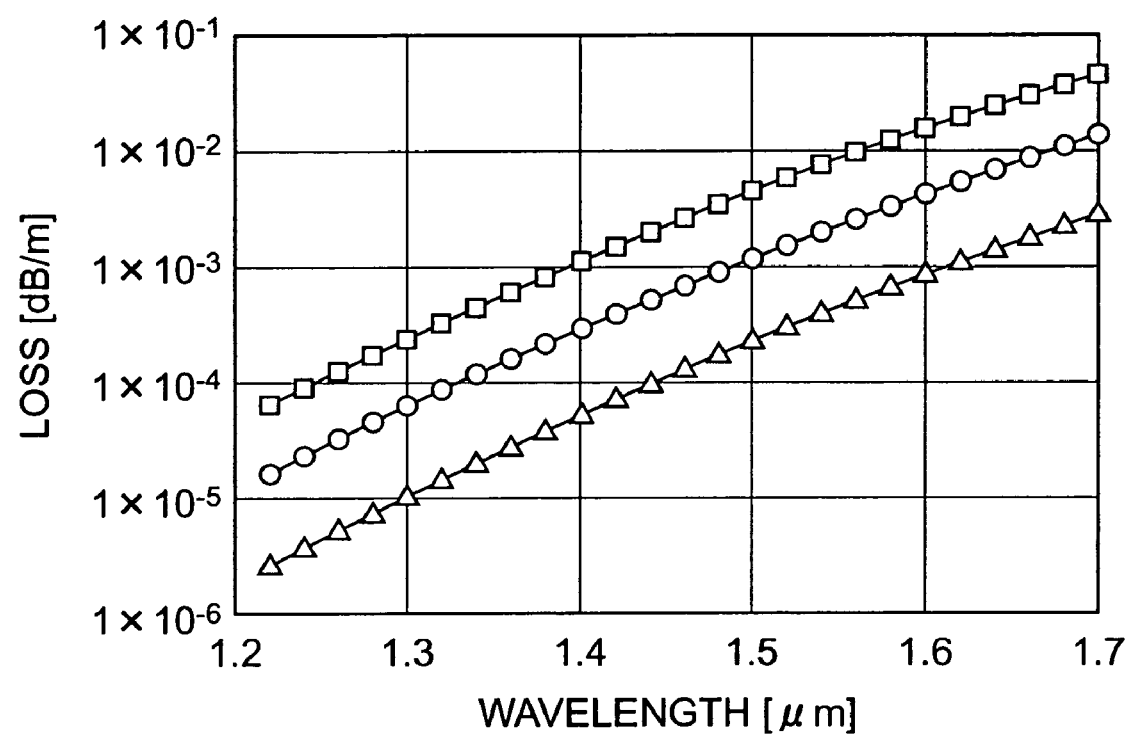
FIG. 15 is a graph showing three examples of confinement loss in optical fibers in accordance with the sixth embodiment.

FIG. 15 is a graph showing confinement losses in three kinds of optical fibers (referred to as optical fibers 11A, 11B, 11C) in which the pitch Λ of voids is 1.595 μm, 1.73 μm, and 1.495 μm, respectively. The optical fibers 11A to 11C have the same configurations and chromatic dispersion characteristics as those of the optical fibers 10A to 10C explained in the second embodiment, respectively, except for the lack of the fifth region 24.

In the optical fiber 11A, the outermost part of the cladding region 14 is the fourth region 22 whose thickness equals the pitch Λ of voids, whereas its radial thickness T[4] is 1.595 μm. Here, n[0] is 1.444, whereas n[4] is 1.1046, whereby the parameter C indicating the strength of light confinement is 1.48, thus satisfying the above-mentioned expression (10).

As shown in FIG. 15, it is seen that the optical fiber 11A (indicated by circles in FIG. 15) exhibits a low optical confinement loss of $3.3\times10^{-5}$ dB/m to $9.0\times10^{-3}$ dB/m within the wavelength band from 1.26 μm to 1.66 μm. As a result, a transmission loss of 0.1 dB/m or less can be realized in this wavelength band.

In the optical fiber 11B, the outermost part of the cladding region 14 is the fourth region 22 whose thickness equals the pitch Λ of voids, whereas its radial thickness T[4] is 1.73 μm. Therefore, the parameter C indicating the strength of light confinement is 1.61, thus satisfying the above-mentioned expression (10).

As shown in FIG. 15, it is seen that the optical fiber 11B (indicated by triangles in FIG. 15) exhibits a low optical confinement loss of $5.3\times10^{-6}$ dB/m to $1.8\times10^{-3}$ dB/m within the wavelength band from 1.26 μm to 1.66 μm. As a result, a transmission loss of 0.1 dB/m or less can be realized in this wavelength band.

In the optical fiber 11C, the outermost part of the cladding region 14 is the fourth region 22 whose thickness equals the pitch Λ of voids, whereas its radial thickness T[4] is 1.495 μm. Therefore, the parameter C indicating the strength of light confinement is 1.39, thus satisfying the above-mentioned expression (10).

As shown in FIG. 15, it is seen that the optical fiber 11C (indicated by squares in FIG. 15) exhibits a low optical confinement loss of $1.4\times10^{-4}$ dB/m to $3.1\times10^{-2}$ dB/m within the wavelength band from 1.26 μm to 1.66 μm. As a result, a transmission loss of 0.1 dB/m or less can be realized in this wavelength band.

A seventh embodiment of the present invention will now be explained. Here, constituents identical to those explained in the above-mentioned first to sixth embodiments will be referred to with numerals identical thereto, without repeating their overlapping descriptions.

The optical fibers 11D to 11F in accordance with the seventh embodiment comprise the same configurations as with the optical fibers 10D to 10F explained in the fifth embodiment, respectively, except that the fifth region 24 constituting the cladding region 14 is not included.

The optical fibers 11D to 11F in accordance with the seventh embodiment also satisfy the relationship of

C>1.0 as explained in the sixth embodiment. Namely, the outermost part of the cladding region 14 is the fourth region 22, whereby this embodiment satisfies the relationship of $$C = T[4] \cdot \overline{n[0]^2 - n[4]^2} > 1.0. \qquad (11)$$

Therefore, the cladding region 14 can fully confine light, thereby making it possible to lower the optical confinement loss. As a result, the transmission loss can be lowered.

In the optical fiber 11D, the outermost part of the cladding region 14 is the fourth region 22 whose thickness equals the pitch Λ of voids, whereas its radial thickness T[4] is 1.5 μm. Here, n[0] is 1.444, whereas n[4] is 1.1046, whereby the parameter C indicating the strength of light confinement is 1.41, thus satisfying the above-mentioned expression (11).

Figure 16:
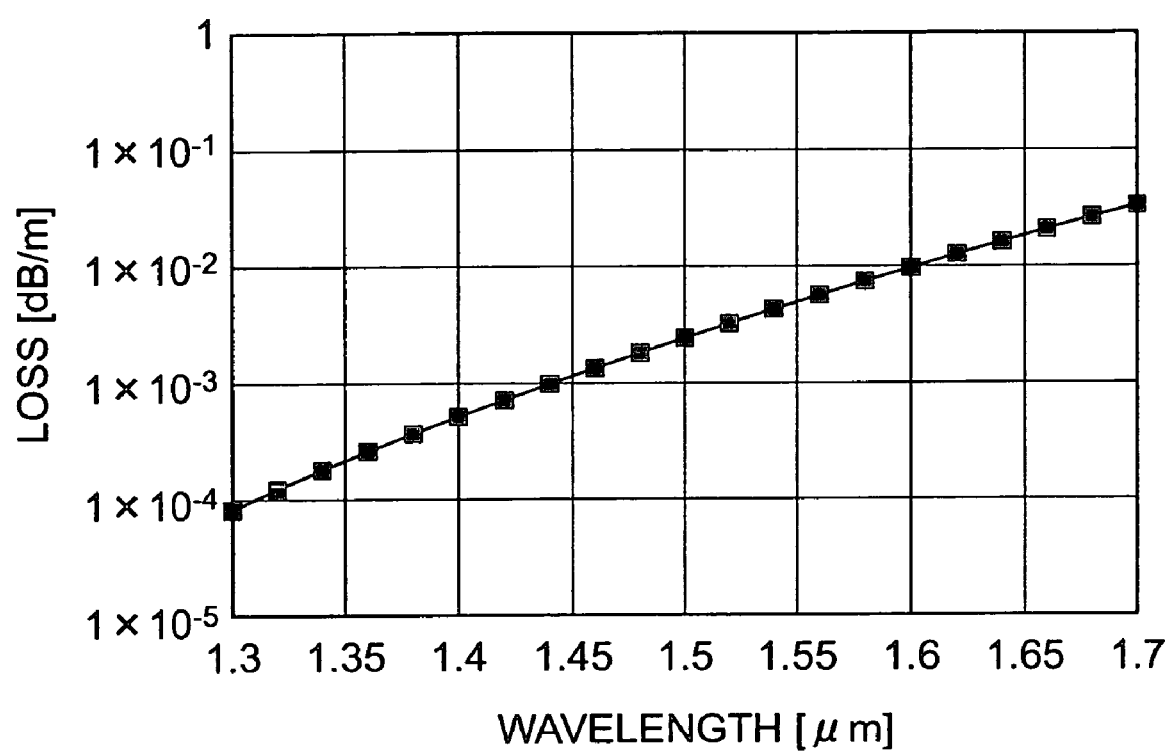
FIG. 16 is a graph showing an example of confinement loss in an optical fiber in accordance with the seventh embodiment.

As shown in FIG. 16, it is seen that the optical fiber 11D (indicated by squares in FIG. 15) exhibits a low optical confinement loss of $3.5\times10^{-4}$ dB/m to $1.9\times10^{-2}$ dB/m within the wavelength band from 1.38 μm to 1.66 μm. As a result, a transmission loss of 0.1 dB/m or less can be realized in this wavelength band.

In the optical fiber 11E, the outermost part of the cladding region 14 is the fourth region 22 whose thickness equals the pitch Λ of voids, whereas its radial thickness T[4] is 1.47 μm. Therefore, the parameter C indicating the strength of light confinement is 1.39, thus satisfying the above-mentioned expression (11).

Figure 17:
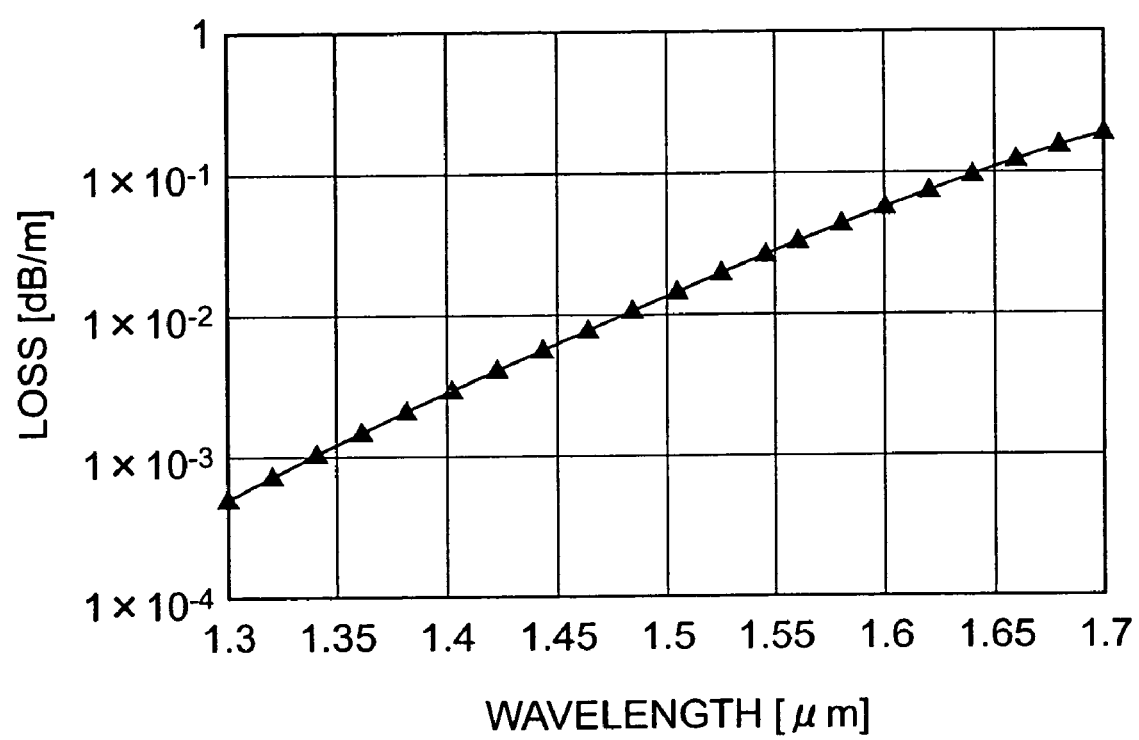
FIG. 17 is a graph showing another example of confinement loss in an optical fiber in accordance with the seventh embodiment.

As shown in FIG. 17, it is seen that the optical fiber 11E exhibits a low optical confinement loss of $2.1\times10^{-3}$ dB/m to 1.5×10$^{-1}$ dB/m within the wavelength band from 1.38 µm to 1.68 µm. As a result, a transmission loss of 1.0 dB/m or less can be realized in this wavelength band.

In the optical fiber 11F, the outermost part of the cladding region 14 is the fourth region 22 whose thickness equals the pitch Λ of voids, whereas its radial thickness T[4] is 1.375 µm. Therefore, the parameter C indicating the strength of light confinement is 1.30, thus satisfying the above-mentioned expression (11).

Figure 18:
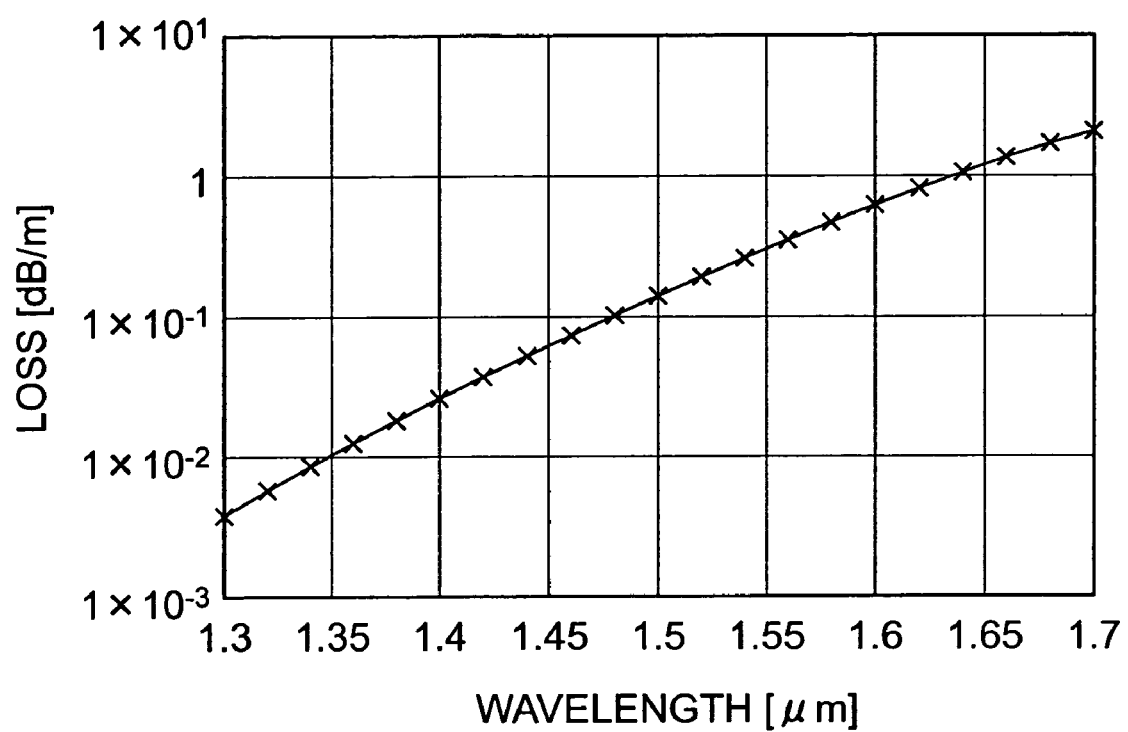
FIG. 18 is a graph showing another example of confinement loss in an optical fiber in accordance with the seventh embodiment.

As shown in FIG. 18, it is seen that the optical fiber 11F exhibits a low optical confinement loss of 1.8×10$^{-2}$ dB/m to 1.0 dB/m within the wavelength band from 1.38 µm to 1.64 µm. As a result, a transmission loss of 3.0 dB/m or less can be realized in this wavelength band.

Without being restricted to the above-mentioned embodiments, the present invention can be modified in various manners.

In the above-mentioned first embodiment, the cladding region 14 is explained in terms of a three-layer structure composed of the first to third regions 16 to 20 as a region satisfying the above-mentioned expression (1). However, four or more layers of a region satisfying the above-mentioned expression (1) may be provided.

In the above-mentioned fourth embodiment, any optical fibers including a fiber segment such as the one shown in FIG. 10 and having respective cross-sectional structures continuous to those at one end 72 and the other end 74 may be fusion-spliced to these ends, so as to construct an optical fiber.

A configuration in which the core region includes an area made of an auxiliary medium is also possible.

Figure 19:
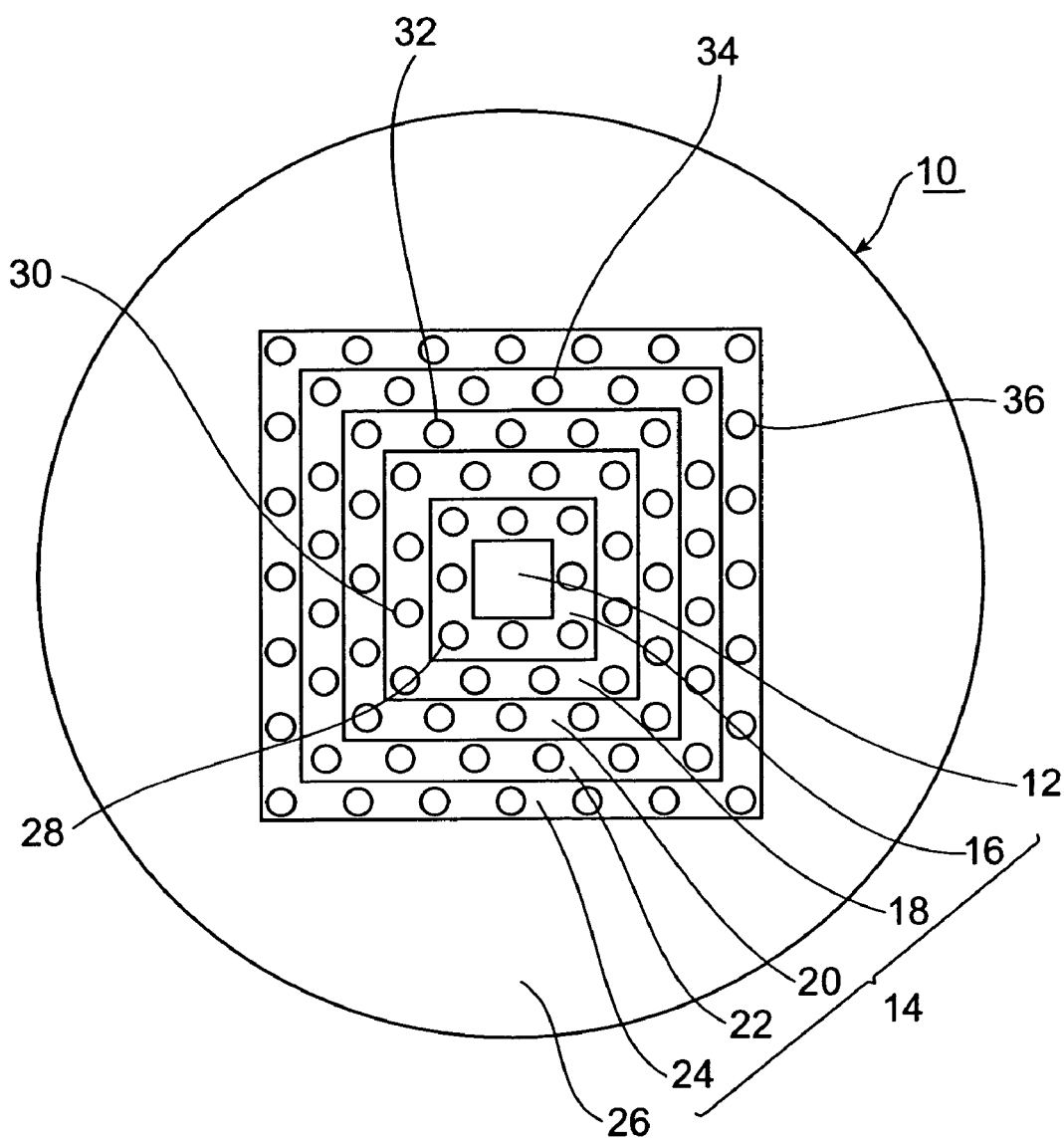
FIGS. 19 and 20 are sectional views showing modified examples of a cross section of an optical fiber, taken along a plane perpendicular to a fiber axis (predetermined axis) X.

Also, the voids included in each of the first to fifth regions 16 to 24 may be arranged in a polygonal form in a cross section perpendicular to the fiber axis X, e.g., in a square form (or parallelogram form) as shown in FIG. 19.

Figure 20:
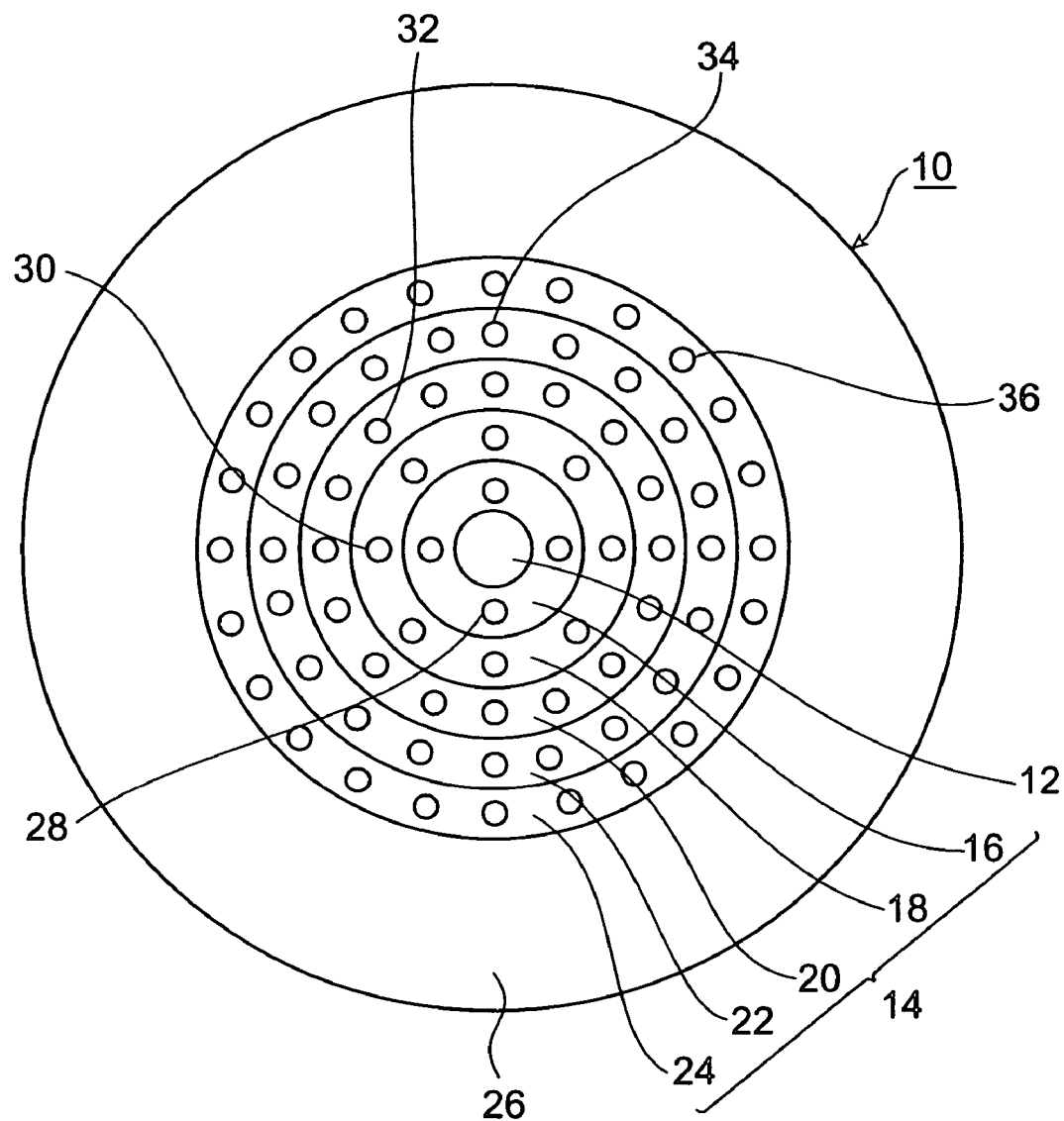

Also, as shown in FIG. 20, the voids included in each of the first to fifth regions 16 to 24 may be arranged in a circular form in a cross section perpendicular to the fiber axis X.

As explained in detail in the foregoing, the present invention can provide an optical fiber which can increase the degree of freedom in adjusting chromatic dispersion and the adjustable wavelength range.

From the foregoing explanations of the invention, it will be obvious that many variations of the invention are possible. Such variations are not to be regarded as a departure from the spirit and scope of the invention, and all such modifications as would be obvious to one skilled in the art are intended to be included within the scope of the following claims.

What is claimed is:

1. An optical fiber comprising a core region extending along a predetermined axis, and a cladding region surrounding the core region;
    the cladding region having first to (N+1)-th regions (where N is an integer of 2 or greater) such that the first region surrounds the core region, and the (k+1)-th region surrounds the k-th region (k=1,2, . . . ,N);
    at least one of the first to (N+1)-th regions including, in a main medium having a predetermined refractive index, a sub-region made of an auxiliary medium having a refractive index different from that of the main medium;
    letting n[0] be the average refractive index of the core region, and n[k] (k=1, 2, . . . , N+1) be the average refractive index of the k-th region, the optical fiber satisfying the relationship of n[0]>n[1], and n[i]>n[i+1] (∀i=h, h+1, . . . , h+m; where h and m are natural numbers).

2. An optical fiber according to claim 1, satisfying the relationship of $n[i]>n[i+1]$ (∀$i$=0, 1, . . . , $N$).

3. An optical fiber according to claim 2, wherein the cladding region further has an (N+2)-th region surrounding the (N+1)-th region; and
    wherein the (N+2)-th and (N+1)-th regions include respective average refractive indices n[N+2] and n[N+1] satisfying the relationship of $n[N+1]<n[N+2]$.

4. An optical fiber according to claim 2, wherein the main medium is pure silica glass, or silica glass including at least one of Ge, F, Cl, P, N, B, Al, Ti, Er, Yb, Nd, Pr, and Bi; and wherein the auxiliary medium is a vacuum or gas.

5. An optical fiber according to claim 2, exhibiting a dispersion nonflatness of 0.003 ps/nm$^2$/km or less at zero dispersion in a predetermined wavelength band having a width of at least 50 nm.

6. An optical fiber according to claim 2, exhibiting a dispersion nonflatness of 0.004 ps/nm$^2$/km or less in a predetermined wavelength band having a width of at least 50 nm; and wherein a chromatic dispersion in the predetermined wavelength band is an anomalous dispersion having an average value of +20 ps/nm/km or less.

7. An optical fiber according to claim 2, exhibiting a dispersion nonflatness of 0.006 ps/nm$^2$/km or less in a predetermined wavelength band having a width of at least 50 nm; and wherein a chromatic dispersion in the predetermined wavelength band is a normal dispersion having an average value of −20 ps/nm/km or less.

8. An optical fiber according to claim 2, wherein a cross-sectional area of the sub-region made of the auxiliary medium in a cross section perpendicular to the predetermined axis varies along the predetermined axis.

9. An optical fiber according to claim 8, comprising:
    a first category fiber segment exhibiting a dispersion nonflatness of 0.007 ps/nm$^2$/km or less in a predetermined wavelength band having a width of at least 50 nm, and having an anomalous chromatic dispersion with an average value of +1 ps/nm/km or greater in the predetermined wavelength band; and
    a second category fiber segment exhibiting a dispersion nonflatness of 0.007 ps/nm$^2$/km or less in the predetermined wavelength band, and having a normal chromatic dispersion with an average value of −1 ps/nm/km or less in the predetermined wavelength band.

10. An optical fiber according to claim 8, comprising a fiber segment having one end and the other end; wherein the fiber segment exhibits a dispersion nonflatness of 0.007 ps/nm$^2$/km or less in a predetermined wavelength band having a width of at least 50 nm; wherein a chromatic dispersion at a predetermined wavelength at the one end is an anomalous dispersion of +1 ps/nm/km or greater; wherein the chromatic dispersion continuously decreases from the one end to the other end; and wherein the other end exhibits a chromatic dispersion not greater than half of that at the one end at the predetermined wavelength.

11. An optical fiber according to claim 2, wherein, letting D(λ) be the chromatic dispersion with respect to each wavelength λ included within a predetermined wavelength band having a width of at least 250 nm, and F(λ) be the function defined by $$F(\lambda)=a\lambda^{-4}+b\lambda^{-2}+c+d\lambda^2+e\lambda^4$$

$a=-24.495$ [ps/nm/km/μm$^{-4}$]

$b=-54.564$ [ps/nm/km/μm$^{-2}$]

$c=35.069$ [ps/nm/km]

$d=1.8867$ [ps/nm/km/μm$^2$]

$e=0.80887$ [ps/nm/km/μm$^4$], a function G(λ, x) is defined as $$G(\lambda, x)=|(F(\lambda)+xD(\lambda))/(1+x)|, \text{ and}$$

the optical fiber gives a positive number x satisfying the relationship of G(λ, x)<0.25 [ps/nm/km].

12. An optical fiber according to claim 1, satisfying the relationship of n[0]>n[1], n[1]<n[2], and n[i]>n[i+1] (∀i= 2, 3, ..., 2+m; where m is a natural number).

13. An optical fiber according to claim 12, wherein, letting D(λ) be the chromatic dispersion with respect to each wavelength λ included within a predetermined wavelength band having a width of at least 250 nm, and F(λ) be the function defined by $$F(\lambda)=a\lambda^{-4}+b\lambda^{-2}+c+d\lambda^2+e\lambda^4$$

$a=-24.495$ [ps/nm/km/μm$^{-4}$]

$b=-54.564$ [ps/nm/km/μm$^{-2}$]

$c=35.069$ [ps/nm/km]

$d=1.8867$ [ps/nm/km/μm$^2$]

$e=0.80887$ [ps/nm/km/μm$^4$], a function G(λ, x) is defined as $$G(\lambda, x)=|(F(\lambda)+xD(\lambda))/(1+x)|, \text{ and}$$

the optical fiber gives a positive number x satisfying the relationship of G(λ, x)<0.25 [ps/nm/km].

14. An optical fiber comprising a core region extending along a predetermined axis, and a cladding region surrounding the core region;
the optical fiber exhibiting a dispersion nonflatness of 0.003 ps/nm$^2$/km or less at zero dispersion in a predetermined wavelength band having a width of at least 50 nm.

15. An optical fiber comprising a core region extending along a predetermined axis, and a cladding region surrounding the core region;
the optical fiber exhibiting a dispersion nonflatness of 0.004 ps/nm$^2$/km or less in a predetermined wavelength band having a width of at least 50 nm, a chromatic dispersion in the predetermined wavelength band being an anomalous dispersion having an average value of +20 ps/nm/km or less.

16. An optical fiber comprising a core region extending along a predetermined axis, and a cladding region surrounding the core region;
the optical fiber exhibiting a dispersion nonflatness of 0.006 ps/nm$^2$/km or less in a predetermined wavelength band having a width of at least 50 nm, a chromatic dispersion in the predetermined wavelength band being a normal dispersion having an average value of −20 ps/nm/km or greater.

17. An optical fiber comprising a core region extending along a predetermined axis, and a cladding region surrounding the core region;
the optical fiber including:
a first category fiber segment exhibiting a dispersion nonflatness of 0.007 ps/nm$^2$/km or less in a predetermined wavelength band having a width of at least 50 nm, and having an anomalous chromatic dispersion with an average value of +1 ps/nm/km or greater in the predetermined wavelength band; and
a second category fiber segment exhibiting a dispersion nonflatness of 0.007 ps/nm$^2$/km or less in the predetermined wavelength band, and having a normal chromatic dispersion with an average value of −1 ps/nm/km or less in the predetermined wavelength band.

18. An optical fiber comprising a core region extending along a predetermined axis, and a cladding region surrounding the core region;
wherein the optical fiber includes a fiber segment having one end and the other end; wherein the fiber segment exhibits a dispersion nonflatness of 0.007 ps/nm$^2$/km or less in a predetermined wavelength band having a width of at least 50 nm; wherein a chromatic dispersion at a predetermined wavelength at the one end is an anomalous dispersion of +1 ps/nm/km or greater; wherein the chromatic dispersion continuously decreases from the one end to the other end; and wherein the other end exhibits a chromatic dispersion not greater than half of that at the one end at the predetermined wavelength.

19. An optical fiber comprising a core region extending along a predetermined axis, and a cladding region surrounding the core region;
wherein, letting D(λ) be the chromatic dispersion with respect to each wavelength λ included within a predetermined wavelength band having a width of at least 250 nm, and F(λ) be the function defined by $$F(\lambda)=a\lambda^{-4}+b\lambda^{-2}+c+d\lambda^2+e\lambda^4$$

$a=-24.495$ [ps/nm/km/μm$^{-4}$]

$b=-54.564$ [ps/nm/km/μm$^{-2}$]

$c=35.069$ [ps/nm/km]

$d=1.8867$ [ps/nm/km/μm$^2$]

$e=0.80887$ [ps/nm/km/μm$^4$], a function G(λ, x) is defined as $$G(\lambda, x)=|(F(\lambda)+xD(\lambda))/(1+x)|, \text{ and}$$

the optical fiber gives a positive number x satisfying the relationship of G(λ, x)<0.25 [ps/nm/km].

20. An optical fiber according to claim 1, wherein, letting T[N+1] μm be the radial thickness of the (N+1)-th region, the optical fiber satisfies the relationship of $$T[N+1]\cdot\sqrt{n[0]^2-n[N+1]^2}>1.0.$$

21. An optical fiber according to claim 2, wherein, letting T[N+1] μm be the radial thickness of the (N+1)-th region, the optical fiber satisfies the relationship of $$T[N+1]\cdot\sqrt{n[0]^2-n[N+1]^2}>1.0.$$

22. An optical fiber according to claim 12, wherein, letting $\overline{T[N+1]}$ µm be the radial thickness of the (N+1)-th region, the optical fiber satisfies the relationship of $$\overline{T[N+1]} \cdot \sqrt{n[0]^2 - n[N+1]^2} > 1.0.$$

23. An optical fiber according to claim 5, exhibiting a transmission loss of 0.1 dB/m or less in the predetermined wavelength band.

24. An optical fiber according to claim 6, exhibiting a transmission loss of 0.1 dB/m or less in the predetermined wavelength band.

25. An optical fiber according to claim 7, exhibiting a transmission loss of 0.1 dB/m or less in the predetermined wavelength band.

26. An optical fiber according to claim 11, exhibiting a transmission loss of 0.1 dB/m or less in the predetermined wavelength band.

27. An optical fiber according to claim 14, exhibiting a transmission loss of 0.1 dB/m or less in the predetermined wavelength band.

28. An optical fiber according to claim 15, exhibiting a transmission loss of 0.1 dB/m or less in the predetermined wavelength band.

29. An optical fiber according to claim 16, exhibiting a transmission loss of 0.1 dB/m or less in the predetermined wavelength band.

30. An optical fiber according to claim 19, exhibiting a transmission loss of 0.1 dB/m or less in the predetermined wavelength band.

31. An optical fiber according to claim 13, exhibiting a transmission loss of 3 dB/m or less in the predetermined wavelength band.

32. An optical fiber according to claim 1, wherein the sub-region made of the auxiliary medium included in the first to (N+1)-th regions is arranged in a hexagonal form in a cross section perpendicular to the predetermined axis.

33. An optical fiber comprising a core region extending along a predetermined axis, and a cladding region surrounding the core region;

the cladding region having at least three layers continuing to a radially outside, the three layers including inner, intermediate, and outer layers toward the radially outside;

at least one of the layers including, in a main medium having a predetermined refractive index, a sub-region made of an auxiliary medium having a refractive index different from that of the main medium;

the intermediate layer exhibiting an average refractive index lower than that of the inner layer, the outer layer exhibiting an average refractive index lower than that of the intermediate layer.

* * * * *